US011859077B2

(12) United States Patent
Friesen et al.

(10) Patent No.: US 11,859,077 B2
(45) Date of Patent: Jan. 2, 2024

(54) SOLVENT-LESS IONIC LIQUID EPOXY RESIN

(71) Applicant: ARIZONA BOARD OF REGENTS ON BEHALF OF ARIZONA STATE UNIVERSITY, Scottsdale, AZ (US)

(72) Inventors: Cody Friesen, Fort McDowell, AZ (US); Jose Antonio Bautista-Martinez, Mesa, AZ (US); Mykhaylo Goncharenko, Scottsdale, AZ (US); Paul Johnson, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 90 days.

(21) Appl. No.: 17/227,223

(22) Filed: Apr. 9, 2021

(65) Prior Publication Data
US 2021/0363341 A1   Nov. 25, 2021

Related U.S. Application Data

(63) Continuation of application No. 16/344,751, filed as application No. PCT/US2017/058142 on Oct. 24, 2017, now Pat. No. 10,975,238.

(60) Provisional application No. 62/412,741, filed on Oct. 25, 2016.

(51) Int. Cl.
| | |
|---|---|
| C07D 247/02 | (2006.01) |
| C08G 59/50 | (2006.01) |
| C08L 63/00 | (2006.01) |
| C08G 59/24 | (2006.01) |
| C08G 59/30 | (2006.01) |
| C08K 5/00 | (2006.01) |
| C08K 5/19 | (2006.01) |
| C08K 5/3435 | (2006.01) |
| C08K 5/3445 | (2006.01) |
| C08K 5/42 | (2006.01) |
| H01G 9/025 | (2006.01) |
| H01G 11/56 | (2013.01) |

(52) U.S. Cl.
CPC ............ *C08L 63/00* (2013.01); *C08G 59/245* (2013.01); *C08G 59/302* (2013.01); *C08G 59/304* (2013.01); *C08G 59/504* (2013.01); *C08G 59/506* (2013.01); *C08G 59/5033* (2013.01); *C08G 59/5073* (2013.01); *C08K 5/0016* (2013.01); *C08K 5/19* (2013.01); *C08K 5/3435* (2013.01); *C08K 5/3445* (2013.01); *C08K 5/42* (2013.01); *H01G 9/025* (2013.01); *H01G 11/56* (2013.01); *Y02P 20/54* (2015.11)

(58) Field of Classification Search
None
See application file for complete search history.

(56) References Cited

U.S. PATENT DOCUMENTS

| | | | |
|---|---|---|---|
| 5,229,392 A | * | 7/1993 | George ................... A61P 13/02 544/332 |
| 8,075,757 B2 | | 12/2011 | Friesen et al. |
| 8,168,337 B2 | | 5/2012 | Friesen et al. |
| 8,282,809 B2 | | 10/2012 | Friesen et al. |
| 8,309,259 B2 | | 11/2012 | Friesen et al. |
| 8,445,133 B2 | | 5/2013 | Friesen et al. |
| 8,450,498 B2 | | 5/2013 | Paley |
| 8,470,157 B2 | | 6/2013 | Friesen et al. |
| 8,481,207 B2 | | 7/2013 | Friesen et al. |
| 8,546,028 B2 | | 10/2013 | Friesen et al. |
| 8,895,197 B2 | | 11/2014 | Friesen et al. |
| 9,184,478 B2 | | 11/2015 | Friesen et al. |
| 9,236,643 B2 | | 1/2016 | Friesen et al. |
| 9,346,925 B2 | | 5/2016 | Chen et al. |

(Continued)

FOREIGN PATENT DOCUMENTS

| | | | | |
|---|---|---|---|---|
| CN | 102197066 A | | 9/2011 | |
| CN | 102531991 A | * | 7/2012 | ............. B01D 53/14 |

(Continued)

OTHER PUBLICATIONS

Machine translation of CN-102531991-A (no date).*
Extended European Search Report in European Appln. No. 20922504.4, dated Aug. 26, 2022, 7 pages.
Office Action in Chinese Appln. No. 201780071976.X, dated Nov. 16, 2022, 14 pages (with English translation).
Adamovich, et al., "Biologically active protic (2-hydroxyethyl) ammonium ionic liquids. Liquid aspirin," Letters to the Editor in Russian Chemical Bulletin, International Edition, vol. 61, No. 6, Jun. 2012, pp. 1260-1261.
Al-Mohammed, et al., "Bis-imidazolium and benzimidazolium based gemini-type ionic liquids structure: synthesis and antibacterial evaluation", Royal Society of Chemistry, RSC Advanced, 2015, 5, pp. 92602-92617.
Araujo, et al., "Cholinium-based ionic liquids with pharmaceutically active anions", Royal Society of Chemistry, RSC Advances, 2014, 4, pp. 28126-28132.

(Continued)

*Primary Examiner* — Michael J Feely
(74) *Attorney, Agent, or Firm* — Fish & Richardson P.C.

(57) ABSTRACT

Solvent free epoxy system that includes: a hardener compound H comprising: a molecular structure ($Y^1$—$R_1$—$Y^2$), wherein $R_1$ is an ionic moiety $Y^1$ is a nucleophilic group and $Y^2$ nucleophilic group; and an ionic moiety A acting as a counter ion to $R_1$; and an epoxy compound E comprising: a molecular structure ($Z^1$—$R_2$—$Z^2$), wherein $R_2$ is an ionic moiety, $Z^1$ comprises an epoxide group, and $Z^2$ comprises an epoxide group; and an ionic moiety B acting as a counter ion to $R_2$. In embodiments, the epoxy compound E and/or the hardener H is comprised in a solvent-less ionic liquid. The systems can further include accelerators, crosslinkers, plasticizers, inhibitors, ionic hydrophobic and/or super-hydrophobic compounds, ionic hydrophilic compounds, ionic transitional hydrophobic/hydrophilic compounds, biological active compounds, and/or plasticizer compounds. Polymers made from the disclosed epoxy systems and their methods of used.

11 Claims, 21 Drawing Sheets

(56) References Cited

U.S. PATENT DOCUMENTS

| | | |
|---|---|---|
| 9,687,840 B2 | 6/2017 | Gin et al. |
| 9,780,394 B2 | 10/2017 | Friesen et al. |
| 9,882,215 B2 | 1/2018 | Johnson et al. |
| 9,990,578 B2 | 6/2018 | Johnson et al. |
| 10,060,240 B2 | 8/2018 | Friesen et al. |
| 10,090,520 B2 | 10/2018 | Friesen et al. |
| 10,256,460 B2 | 4/2019 | Friesen et al. |
| 10,374,236 B2 | 8/2019 | Friesen et al. |
| 10,443,365 B2 | 10/2019 | Friesen et al. |
| 10,457,853 B2 | 10/2019 | Friesen et al. |
| 10,458,220 B2 | 10/2019 | Switzer et al. |
| 10,482,367 B2 | 11/2019 | Johnson et al. |
| 10,975,238 B2 | 4/2021 | Friesen et al. |
| 2007/0129568 A1 | 6/2007 | Flanagan et al. |
| 2007/0194275 A1 | 8/2007 | Masuda et al. |
| 2009/0017342 A1 | 1/2009 | Friesen et al. |
| 2010/0004389 A1 | 1/2010 | Paley et al. |
| 2010/0048829 A1 | 2/2010 | D'Andola et al. |
| 2011/0039467 A1 | 2/2011 | Xu |
| 2011/0250502 A1 | 10/2011 | Gonzalez et al. |
| 2011/0257409 A1 | 10/2011 | Paley |
| 2014/0212582 A1 | 7/2014 | Padilla-Acevedo et al. |
| 2015/0209776 A1 | 7/2015 | Gin et al. |
| 2016/0350565 A1 | 12/2016 | Friesen et al. |
| 2018/0260673 A1 | 9/2018 | Johnson et al. |
| 2019/0036115 A1 | 1/2019 | Friesen et al. |
| 2019/0123340 A1 | 4/2019 | Friesen et al. |
| 2019/0276662 A1 | 9/2019 | Friesen et al. |
| 2019/0355996 A1 | 11/2019 | Friesen et al. |
| 2022/0153922 A1 | 5/2022 | Friesen et al. |

FOREIGN PATENT DOCUMENTS

| | | |
|---|---|---|
| CN | 105949129 | 9/2016 |
| EP | 2174969 | 4/2010 |
| EP | 2950153 | 12/2015 |
| JP | 2004-059924 A | 2/2004 |
| JP | 2010-150356 A | 7/2010 |
| JP | 2012-012350 A | 1/2012 |
| WO | WO 2008/079586 | 7/2008 |
| WO | WO 2008/080075 | 7/2008 |
| WO | WO 2009/124249 | 10/2009 |
| WO | WO 2009/142848 | 11/2009 |
| WO | WO 2010/132357 | 11/2010 |
| WO | WO 2011/142855 | 11/2011 |
| WO | WO 2011/143368 | 11/2011 |
| WO | WO 2011/146154 | 11/2011 |
| WO | WO 2013/106122 | 7/2013 |
| WO | WO 2014/159676 | 10/2014 |
| WO | WO 2014/164150 | 10/2014 |
| WO | WO 2015/105746 | 7/2015 |
| WO | WO 2015/106132 | 7/2015 |
| WO | WO 2015/175553 | 11/2015 |
| WO | WO 2015/175556 | 11/2015 |
| WO | WO 2010/002438 | 1/2016 |
| WO | WO 2016/037094 | 3/2016 |
| WO | WO 2016/137931 | 9/2016 |
| WO | WO2018081165 A1 | 5/2018 |

OTHER PUBLICATIONS

Balk, et al., "'Pro et contra' ionic liquid drugs—Challenges and opportunities for pharmaceutical translation", European Journal of Pharmaceutics and Biopharmaceutics 94 (2015) pp. 291-304.

Bica, et al., "Pharmaceutically active ionic liquids with solids handling, enhanced thermal stability, and fast release", Chem. Commun., 2012, 48, pp. 5422-5424.

Bratychak, et al.,"Synthesis and Properties of Peroxy Derivatives of Epoxy Resins Based on Bisphenol A. 1. Effects of the Presence of Inorganic Bases", Polymer Engineering and Science, Aug. 1999, vol. 39, pp. 1541-1549.

Choi, et al., "Dual functional ionic liquids as plasticisers and antimicrobial agents for medical polymers", Green Chem. 2011, 13, pp. 1527-1535.

Environmental Protection Agency, "EPA-453/R-08-005 Control Techniques Guidelines for Miscellaneous Industrial Adhesives", Sep. 2008, 47 pages.

Fedoseev, M. et al., "1-Butyl-3-methylimidazolium Salts as New Catalysts to Produce Epoxy-anhydride Polymers with Improved Properties", International Journal of Polymer Science, May 2014, vol. 2014, 8 pages, Article ID 607341 <DOI:10.1155/2014/607341>.

Ferraz, et al., "Antitumor Activity of Ionic Liquids Based on Ampicillin", ChemMedChem, 2015, 10, pp. 1480-1483.

Hager, et al., Self-Healing Materials, Adv. Mater., 2010, 22, pp. 5424-5430.

Handy, "Applications of Ionic Liquids in Science and Technology", IntechOpen, Sep. 2011, pp. 1-528 <DOI: 10.5772/1769>.

Hohlbein, et al., "Self-healing dynamic bond-based rubbers: understanding the mechanisms in ionomeric elastomer model systems", Phys. Chem. Chem. Phys., 2015, 17, pp. 21005-21017.

Hough, et al., "The third evolution of ionic liquids: active pharmaceutical ingredients", New J. Chem., 2007, 31, pp. 1429-1436.

Ignat'Ev, et al., "New hydrophobic ionic liquids with perfluoroalkyl phosphate and cyanofluoroborate anions", Journal of Fluorine Chemistry 177 (2015) pp. 46-54.

Immergut, et al., Principles of Plasticization in Platzer:, Plasticization and Plasticizer Processes Advances in Chemistry; American Chemical Society: Washington, DC, 1965, 26 pages.

JP Office Action in Japanese Appln. No. 2019-543192, dated Oct. 5, 2021, 14 pages (with English translation).

Kern, et al., "Dieletric Analysis for Polymer Processing", J. Mater. Educ., vol. 16, 1994, pp. 293-303.

Kowalczyk et al., "Ionic liquids as convenient latent hardeners of epoxy resins", Polimery, Nov. 2003, vol. 18, No. 11, pp. 833-835 <DOI:10.14314/polimery.2003.833>.

Kunchornsup, et al., "Physical cross-linked cellulosic gel via 1-butyl-3-methylimidazolium chrloride ionic liquid and its electromechanical responses", Sensors and Actuators A, 175, 2012, pp. 155-164.

Li, et al., "Thermal behavior of cellulose diacetate melt using ionic liquids as plasticizers," RSC Advances, 205, 5, pp. 901-g, RSC Adv., 2015, 5, pp. 901-907.

Mahadeva, et al., "Electromechanical Behavior of Room Temperature Ionic Liquid Dispersed Cellulose," J. Phys. Chem. C, 2009, 113, pp. 12523-12529.

Maka, et al., "Epoxy resin/phosphonium ionic liquid/carbon nanofiller systems: Chemorheology and properties", eXPRESS Polymer Letters vol. 8, No. 10, 2014. pp. 723-732.

Maka, H. et al., "Deep Eutectic Ionic Liquids as Epoxy Resin Curing Agents", International Journal of Polymer Analysis and Characterization, Oct. 2014 [available online Aug. 2014], vol. 19, No. 8, pp. 682-692 <DOI: 10.1080/1023666X.2014.953835>.

Maka, H. et al., "Epoxy Resin/Ionic Liquid Systems: The Influence of Imidazolium Cation Size and Anion Type on Reactivity and Thermomechanical Properties", Industrial and Engineering Chemistry Research, Mar. 2012, vol. 51, pp. 5197-5206 <DOI:10.1021/ie202321j>.

Maka, H. et al., "Imidazolium and Deep Eutectic Ionic Liquids as Epoxy Resin Crosslinkers and Graphite Nanoplatelets Dispersants", Journal of Applied Polymer Science, Jan. 2014, vol. 131, pp. 40401-1-40401-7<DOI:10.1002/app.40401>.

Mandal, et al., "Ionic Liquid Integrated Multiwalled Carbon Nanotube in a Poly (vinylidene fluoride) Matrix: Formation of a Piezoelectric B-Polymorph with Significant Reinforcement and Conductivity Improvement, "ACS Appl. Mater. Interfaces 2013, 5, pp. 747-760.

Matsumoto, K. et al., "Confinement of Ionic Liquid by Networked Polymers Based on Multifunctional Epoxy Resins", Macromolecules, Jul. 2008, vol. 41, No. 19, pp. 6981-6986 <DOI: 10.1021/ma801293j>.

Matsumoto, K. et al., "Synthesis and properties of methacrylate-based ionic networked polymers containing ionic liquids: comparison of ionic and nonionic networked polymers", Polymer Bulletin, Jun. 2010, vol. 66, No. 6, pp. 771-778 <DOI: 10.1007/s00289-010-0310-1>.

(56) References Cited

OTHER PUBLICATIONS

Meng, Z. et al., "Dissolution of natural polymers in ionic liquids: A review", e-Polymers, Mar. 2012, vol. 12, No. 1, 29 pages, article 028 <DOI: 10.1515/epoly.2012.12.1.317>.

Messadi, et al., "Syntheses and characterisation of hydrophobic ionic liquids containing trialkyl{2-elhoxy-2oxoethyl) ammonium or N-(1-methylpyrrolidy1-2-elhoxy-2-oxoethyl)ammonium cations," Journal of Molecular Liquids 184 (2013), pp. 68-72.

Muhamad, et al., "A review on bisphenol A occurrences, health effects and trewatment process via membrane technology for drinking water,". Environ Sci. Pollut Res. In press. DOI 10.1007/s11356-016-6357-2, pp. 11549-11567.

Nezhad, E. et al., "Task specific ionic liquid as solvent, catalyst and reagent for regioselective ring opening of epoxides in waler", Arabian Journal of Chemistry, Dec. 2014, vol. 12, No. 8, pp. 2098-2103 <DOI: 10.1016/j.arabjc.2014.12.037>.

Nguyen et al., "Ionic Liquids: A New Route for the Design of Epoxy Networks", ACS Sustainable Chem. Eng., [Published online] Oct. 22, 2015, vol. 4, No. 2, pp. 481-490.

Park, et al., Ionic Liquids as Plasticizers/Lubricants for Polylactic Acid:, Polymer Engineering and Science, 2010, 50(6), pp. 1105-1110.

PCT International Search Report and Written Opinion in International Appln. No. PCT/US2017/058142, dated Feb. 12, 2018, 11 pages.

Pernak, et al., Synthesis, properties and evaluation of biological activity of herbicidal ionic liquids with 4-(4-chloro-2-methylphenoxy)butanoate anion, RSC Advances, RSC Adv., 2016, 6, pp. 7330-7338.

Prudencio, et al., "Liquidos Ionicos Como Plastificantes Em Blendas De Borracha Nitrilica/Polianilina", Quim. Nova, 2014, 37 (4), pp. 618-623, English abstract only.

Rahmathullah, M. et al., "Room Temperature Ionic Liquids as Thermally Latent Initiators for Polymerization of Epoxy Resins", Macromolecules, May 2009, vol. 42, No. 9, pp. 3219-3221 <DOI: 10.1021/ma802669k>.

Romeli, et al., "Synthesis and Characterization of Flufenamic Ionic Liquids," J. Appl. Sci., 2014, 14 (23), pp. 3373-3376.

Saurin, N. et al., "Self-Healing of Abrasion Damage in Epoxy Resin-Ionic Liquid Nanocomposites", Tribology Letters, Mar. 2015, vol. 58, No. 4, 9 pages <DOI: 10.1007/s11249-015-0490-9>.

Scott, et al., "Application of ionic liquids as plasticizer for poly(methyl methacrylate)", Chem. Commun., 2002, pp. 1370-1371.

Sha, et al., "Reversible tuning of the hydrophobic-hydrophilic transition of hydrophobic ionic liquids by means of an electric field," Soft Matter, 2011, 7:4228-4233.

Shirshova, N. et al., "Structural Supercapacitor Electrolytes Based on Bicontinuous Ionic Liquid—Epoxy Resin Systems", Journal of Materials Chemistry A, Dec. 2013, vol. 1, No. 48, pp. 15300- 5309, plus supplemental info <DOI: 10.1039/C3TA13163G>.

Soares, B. et al., "Preparation of Epoxy/Jeffamine Networks Modified With Phosphonium Based Ionic Liquids", Macromolecular Materials and Engineering, Nov. 2014, vol. 300, pp. 312-319 <DOI: 10.1002/mame.201400293>.

Soares, B. et al., "Synthesis and Characterization of Epoxy/MCDEA Networks Modified with Imidazolium-Based Ionic Liquids", Macromolecular Materials and Engineering, May 2011, vol. 296, pp. 826-834 <DOI: 10.1002/mame.201000388>.

Soares, et al., "New Epoxy/Jeffamine Networks Modified with Ionic Liquids", Journal of Applied Polymer Science, 2014, pp. 39834-29834.

Throckmorton, J., "Ionic Liquid-Modified Thermosets and Their Nanocomposites: Dispersion, Exfoliation, Degradation, and Cure", Drexel University Doctor of Philosophy Thesis, Jun. 2015, 170 pages.

U.S. Appl. No. 16/687,875, Johnson et al., filed May 12, 2015.

Xiong, et al., "Reversible Hydrophobic-Hydrophilic Transition of Ionic Liquids Diven by Carbon Dioxide", Angew. Chem. Int. Ed. 2015, 54, pp. 7265-7269.

Yarinich, et al., "Synthesis and structure-activity relationship of novel 1,4-diazabicyclo [2.2.2]octane derivatives as potent antimicrobial agents", European Journal of Medicinal Chemistry, 2015, 95, pp. 563-573.

Zhang, et al., "A Novel Dual Amino-Functionalized Cation-Tethered Ionic Liquid for CO2 Capture,",, Ind. Eng. Chem. Res. 2013, 52, pp. 5835-5841.

Zhang, et al., "Ionic Liquids as Plasticizers for Polyelectrolyte Complexes", J. Phys. Chem. B, 2015, 119, pp. 3603-3607.

Zhang, X. et al., "Highly conductive polymer composites from roomtemperature ionic liquid cured epoxy resin: effect of interphase layer on percolation conductance", RSC Advances, 2013, vol. 3, pp. 1916-1921 <DOI: 10.1039/c2ra23027 e>.

[No Author Listed] [online], "Former National Compliance Initiative: Cutting Hazardous Air Pollutants," available on or before Feb. 12, 2020, via Internet Archive: Wayback Machine URL <http://web.archive.org/web/20200311020430/https://www.epa.gov/enforcement/former-national-compliance-initiative-cutting-hazardous-air-pollutants>, 4 pages.

Cabeza, "Properties and Green Aspects of Ionic Liquids," Ionic Liquids in Separation Technology, 2014, 12 pages.

Chiappe et al., "Ionic Liquids: solvent properties and organic reactivity," J. Phys. Org. Chem. 2005, 18, 275-297.

Chiappe et al., "Stereoselective Halogenations of Alkenes and Alkynes in Ionic Liquids," Organic Letters, 2001, 3(7), 1061-1063.

L:howdhury et al., "Reactivity of ionic liquids," Tetrahedron 63 (2007) 2363-2389.

Environmental Protection Agency, "Clean Air Act Stationary Source Compliance Monitoring Strategy," Oct. 2016, 26 pages.

Environmental Protection Agency, "National Emission Standards for Hazardous Air Pollutants (NESHAP): Plywood and Composite Wood Products Compliance Requirements & Timeline," Feb. 16, 2006, retrieved from URL <https://www.epa.gov/stationary-sources-air-pollution/national-emission-standards-hazardous-air-pollutants-neshap-9>, 15 pages.

Guo, X. Pan, C. Zhang, W. Liu, M. Wang, X. Fang, S. Dai., "Ionic liquid electrolyte based on S-propyltetrahydrothiophenium iodide for dye-sensitized solar cells," Solar Energy, 2010, 84, 373-378.

Hagiwara, K. Matsumoto, Y. Nakamori, T. Tsuda, Y. Ito, H. Matsumoto, K Momota, "Physicochemical Properties of 1,3-Dialkylimidazolium Fluorohydrogenate Room-Temperature Molten Salts," J. Electrochem. Soc., 150 (12) D195-D199, 2003.

Jaitely, A. Karatas, A. T. Florence, "Water-immiscible room temperature ionic liquids (RTILs) as drug reservoirs for controlled release," Int. J of Pharmaceutics, 2008, 354, 168-173.

Kamal and G. Chouhan, "A task-specific ionic liquid [bmim]SCN for the conversion of alkyl halides to alkyl thiocyanate at room temperature," Tetrahedron Letters 46 (2005) 1489-1491.

Kim, R. S. Varma, "Tetrahaloindate(III)-Based Ionic Liquids in the Coupling Reaction of Carbon Dioxide and Epoxides to Generate Cyclic Carbonates: H-Bonding and Mechanistic Studies," J. Org. Chem. 2005, 70, 7882-7891.

Moriel, et al., "Synthesis, characterization, and catalytic activity of ionic liquids based on biosources," Tetrahedron Letters 51 (2010) 4877-4881.

Patel, et al., "Applications of Ionic Liquids," The Chemical Record, 2012, 12, 329-355.

siemens.com [online], "Steam Turbines—Power Generation | Energy Technology," available on or before Aug. 26, 2018, via Internet Archive: Wayback Machine URL <http://web.archive.org/web/20180826144615/http://www.siemens.com:80/global/en/home/products/energy/power-generation/steam-turbines.html#!/>, 11 pages.

Yoshino et al., "Halofluorination of alkenes with ionic liquid EMIMF(HF)2.3," Journal of Fluorine Chemistry 125 (2004) 455-458.

\* cited by examiner

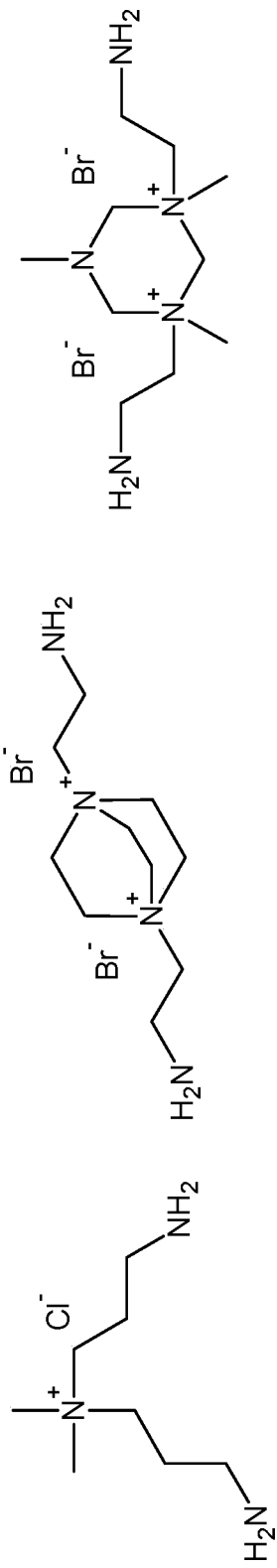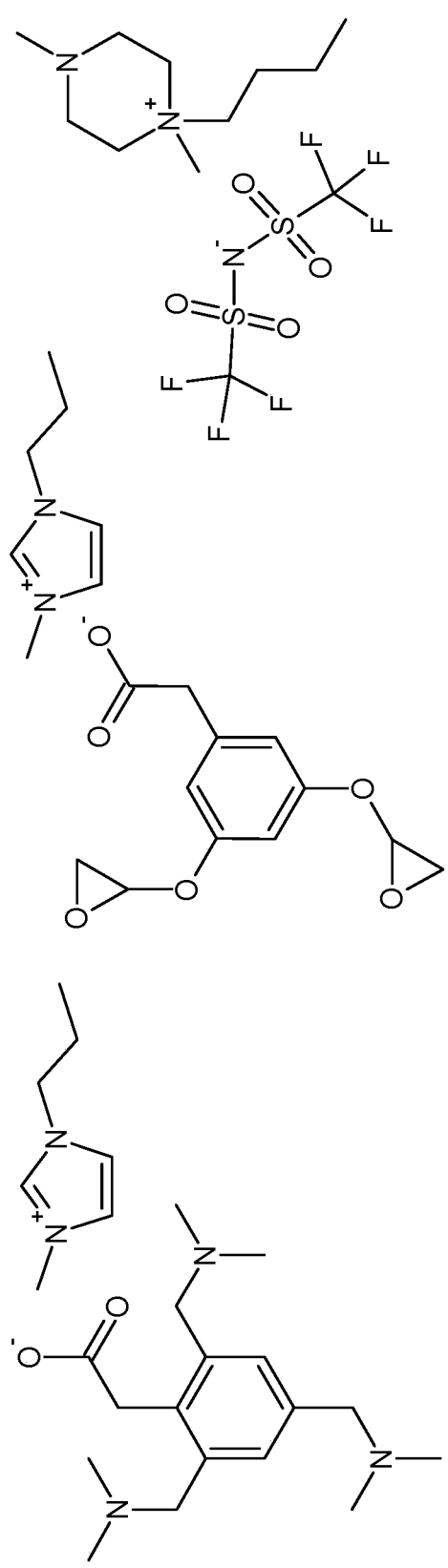
Figure 10A
Figure 10B
Figure 10C
Figure 10D
Figure 10E
Figure 10F

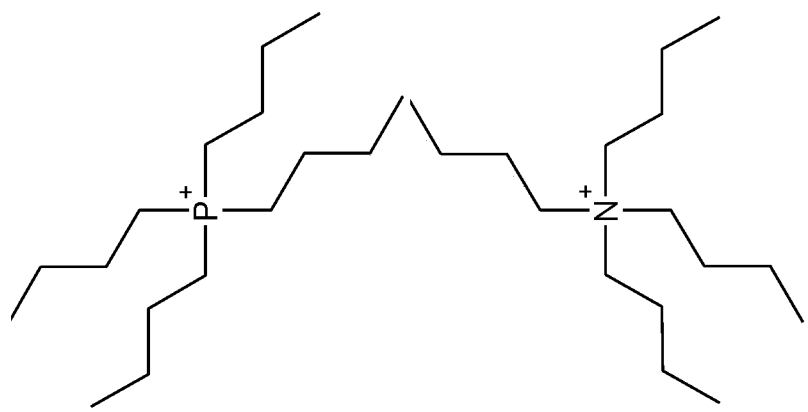
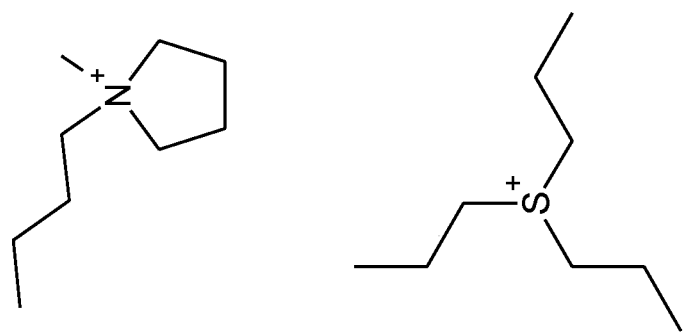
Figure 12
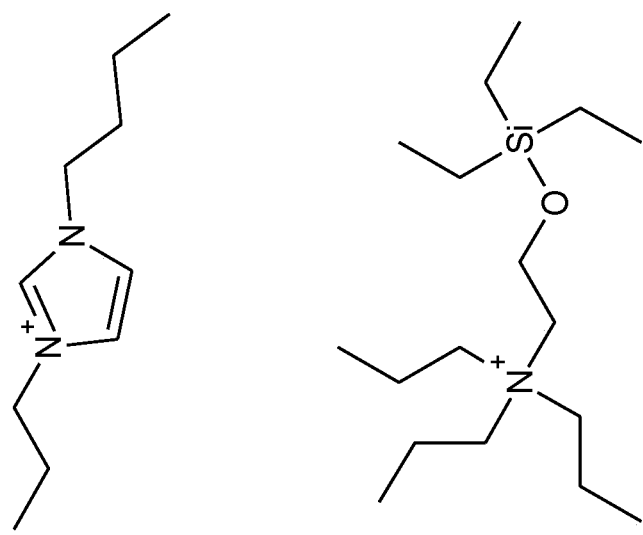

SOLVENT-LESS IONIC LIQUID EPOXY RESIN

CROSS REFERENCE TO RELATED APPLICATION

This application is a continuation of U.S. patent application Ser. No. 16/344,751 filed Apr. 24, 2019, which is a U.S. National Stage Application under 35 USC 371 of International Application No. PCT/US2017/058142 filed on Oct. 24, 2017, which claims the priority benefit of the earlier filing date of U.S. Provisional Application No. 62/412,741, filed Oct. 25, 2016, each of which is hereby incorporated by reference in its entirety.

FIELD OF THE DISCLOSURE

The present disclosure relates to novel ionic epoxy resins, systems containing such resins, and methods of making or using such resins.

BACKGROUND

Traditional epoxy systems often include thermoset polymers that are widely used in dental fillings, printed circuit boards, wind turbines, lightweight vehicles, coatings, sheathing, flooring, adhesives, aerospace applications and a variety of other applications. This wide range of applications is facilitated by the availability of various curing reactions—and associated chemical compositions and structures—that provide for desired properties of hardness, flexibility, adhesion, degree of crosslinking, the nature of the interchain bond, high strength (tensile, compressive and flexural), chemical resistance, fatigue resistance, corrosion resistance and electrical resistance. Properties of uncured epoxy resins, such as viscosity, facilitate processability by appropriate selection of the monomer, the curing agents, and catalyst. Depending on the source, it is estimated that the worldwide epoxy market could increases from 6.0-7.1 USD billion in 2015 to 9.2-10.5 USD billion in 2020 with an average production of 2.5 million metric tons per year.

Traditionally, many of the remarkable properties of epoxy systems come at the cost of significant volatile organic compound (VOC) emissions. Environmental Protection Agency regulations require that at least 80% of all VOCs are captured in industrial processes, resulting in a significant impact on overall operational cost together with health risks for human operators involved in manufacturing.

SUMMARY

Disclosed is a solvent free ionic epoxy system that includes a hardener compound H and an epoxy compound E. The hardener compound comprises a molecular structure $(Y^1-R_1-Y^2)$, wherein $R_1$ is an ionic moiety $Y^1$ is a nucleophilic group and $Y^2$ nucleophilic group; and an ionic moiety A acting as a counter ion to $R_1$. The epoxy compound comprises a molecular structure $(Z^1-R_2-Z^2)$, where $R_2$ is an ionic moiety, $Z^1$ comprises an epoxide group, and $Z^2$ comprises an epoxide group; and an ionic moiety B acting as a counter ion to $R_2$. In embodiments, the epoxy compound E and/or the hardener H is comprised in a solvent-less ionic liquid, which significantly addresses the issue of VOC in traditional epoxies. The systems can further include accelerators, crosslinkers, plasticizers, inhibitors, ionic hydrophobic and/or super-hydrophobic compounds, ionic hydrophilic compounds, ionic transitional hydrophobic/hydrophilic compounds, biological active (BAIL, Biological Active Ionic Liquid) compounds, and/or plasticizer compounds.

Also disclosed are polymers made from the disclosed epoxy systems and their methods of used. In certain embodiments, the polymer produced upon polymerization of hardener compound H and epoxy compound E may have self-healing properties due to the presence of stable electrical charges along to the polymeric chains that drive the healing process through electrostatic attraction. In embodiments, a polymer produced upon polymerization of hardener compound H and epoxy compound E forms a highly and regular porous system, which could be used but not limited to a filtration membrane, solid electrolyte after replacing the secondary ionic liquid, exchange membrane, etc. In certain embodiments, the polymer comprises a solid electrolyte, which may be used as electronic component, such as a component of a battery, a capacitor, a piezoelectric material and/or an electro-actuator.

BRIEF DESCRIPTION OF THE DRAWINGS

FIGS. 10A-10I show the chemical structures of exemplary ionic liquid examples FIG. 10A) and FIG. 10B) ionic liquid hardeners, FIG. 10C) self-catalyzed ionic liquid hardener, FIG. 10D) ionic liquid accelerator, FIG. 10E) ionic liquid epoxy resin, FIG. 10F) ionic liquid accelerator, FIG. 10G) and FIG. 10H) ionic liquid crosslinker, and FIG. 10I) ionic liquid accelerator, in accordance with embodiments disclosed herein.

FIG. 12 shows the chemical structures of examples of hydrophobic cations usable for the synthesis of ionic liquid epoxides and hardeners, in accordance with embodiments disclosed herein.

FIG. 15B) cholinium pyrazinate, cytotoxicity, FIG. 15C) Tris(2-hydroxyethyl)methylammonium salicylate, anticoagulant-antiinflammatory, FIG. 15D) ranitidinium docusate, histaminic-emollient, FIG. 15E) lidocainium docusate, pain reliever-emollient, FIG. 15F) didecyldimethylammonium ibunoprofenate, antibacterial-anti-inflammatory, in accordance with embodiments disclosed herein.

DETAILED DESCRIPTION

Overview

Figure 1:
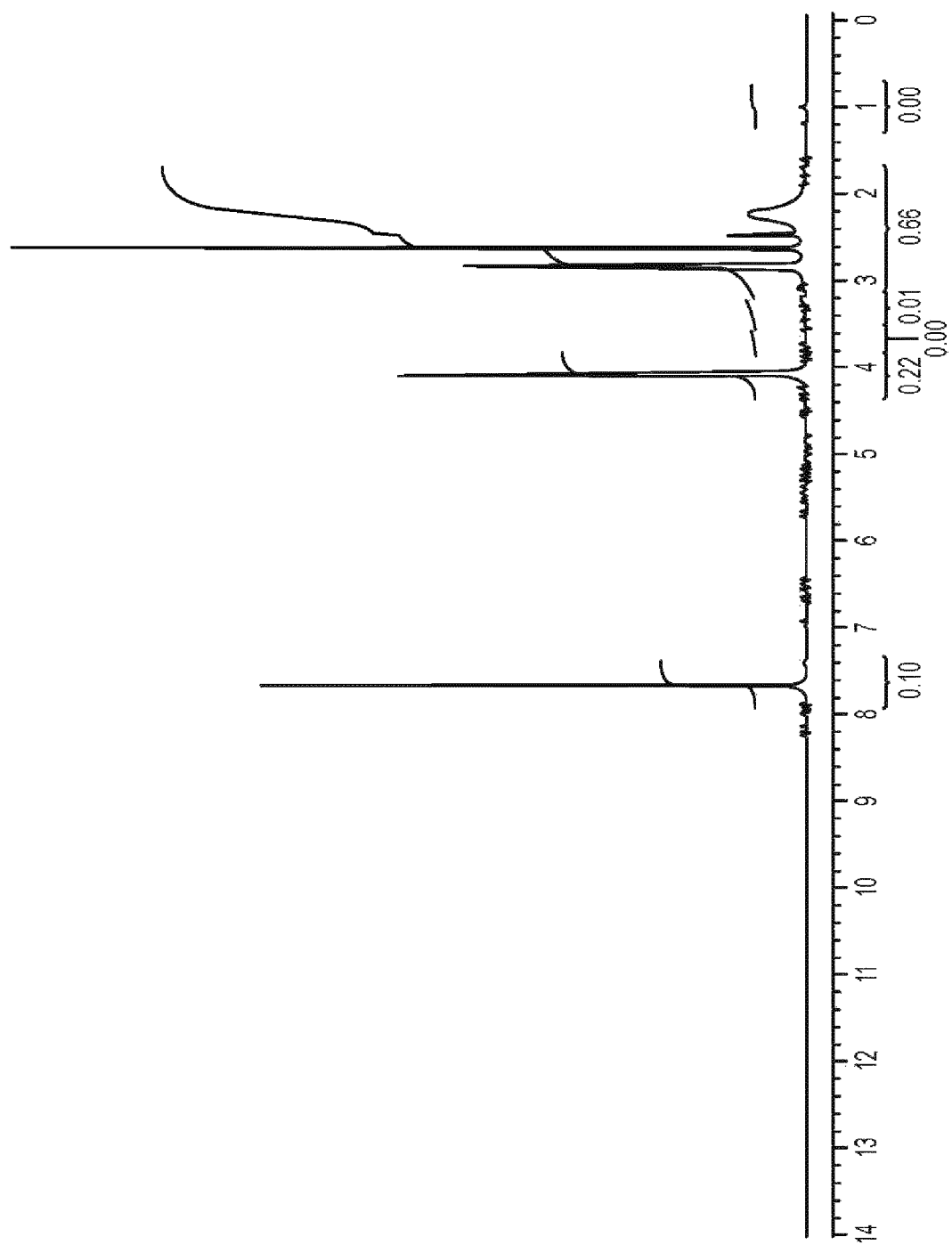
FIG. 1 is an example of a typical NMR spectra of 1,3-di(2'-aminoethylene)-2-methylimidazolium bromide.

Various embodiments are based on a realization by the inventors of an improved epoxy chemistry that limits VOC emissions—e.g., at low vapor pressure while retaining the broad applicability of current systems—to dramatically reduce processing costs and mitigate associated health hazards. The present disclosure relates generally to techniques and mechanisms that, according to different embodiments, variously provide a system of reactive ionic liquids that, when combined, react to form high-strength, versatile and/or added-functionality epoxy-based thermosets. These epoxy systems solve the aforementioned issue of VOC outgassing.

Some embodiments include synthesizing ionic liquids that, for example, incorporate anions substituted with epoxides (glycidyl groups) on the anion. Another such ionic liquid can contain cations of both diamines and triamines. Still another such ionic liquids can contain methylated-DABCO cation catalysts. Room-temperature ionic liquids are organic salts that melt below standard conditions and form solvent-less liquids with a number of unique physical properties, including zero vapor pressure. There are estimated to be ~106 likely ion-pair combinations that form ionic liquids. Synthesizing organic salts that incorporate reactive moieties enable solvent-free and volatile-free chemistry. What follows are a set of example reductions to practice.

To illustrate certain features of various embodiments, solvent-less ionic liquid epoxy systems are variously described with respect to an ionic moiety group $R_1$ and an ionic portion B having respective positive charges, and further with respect to an ionic moiety group $R_2$ and an ionic portion A having respective negative charges. For example, scheme 1 shows a positive $R_1^+$ substituent in a hardener ionic liquid (IL) and the negative $R_2^-$ in the resin IL as one illustrative embodiment. However, in other embodiments, the respective charge signs of ionic moiety groups $R_1$, $R_2$ could be reversed (i.e., wherein the respective charge signs of ionic portions A, B are also reversed).

DESCRIPTION OF SEVERAL EMBODIMENTS

Disclosed herein is an epoxy system that includes a hardener compound (H) and an epoxy compound (E). Typically, the hardener compound and the epoxy compound are provided separately and then mixed to form a polymer when used. In embodiments, the hardener compound has the molecular structure according to:

$$Y^1-R_1-Y^2,$$

wherein $R_1$ is an ionic moiety and $Y^1$ and $Y^2$ are bonded to $R_1$. In certain embodiments $Y^1$ is, or includes, a nucleophilic group. In certain embodiments $Y^2$ is, or includes, a nucleophilic group. In certain embodiments, $Y^1$ and $Y^2$ are identical. In certain embodiments, $Y^1$ and $Y^2$ are non-identical. In specific examples, $Y^1$ and $Y^2$ comprise a nucleophile independently selected from: a $NH_2$ group, a SH group, an OH group, a SeH group, and a $PH_2$ group. In certain embodiments, the hardener compound (H) is part of, such as a component of, a solvent-less ionic liquid, for example as a molecular complex with an ionic moiety A acting as a counter ion to $R_1$. Examples of $Y^1-R_1-Y^2$ are shown in Table 1 and FIGS. 4, 5, 6, 7, 8, 10A-10I and 17A-17D. Examples of ionic counter ions are shown in FIGS. 4, 5, 6, 7, 8, 9, 10A-10I, 13A-17D.

The disclosed epoxy system further incudes an epoxy compound E. In embodiments the epoxy compound has the molecular structure according to:

$$Z^1-R_2-Z^2,$$

where $R_2$ is an ionic moiety, $Z^1$ is or includes an epoxide group, and $Z^2$ is or includes an epoxide group. In certain embodiments, $Z^1$ and $Z^2$ are identical. In certain embodiments, $Z^1$ and $Z^2$ are non-identical. In certain embodiments, the epoxy compound (E) is part of, such as a component of a solvent-less ionic liquid, for example as a molecular complex with an ionic moiety B acting as a counter ion to $R_2$. Examples of $Z^1$—$R_1$—$Z^2$ are shown in Table 1 and FIGS. 4, 5, 6, 7, 8, 10A-10I and 17A-17D. Examples of ionic counter ions are shown in FIGS. 4, 5, 6, 7, 8, 9, 10A-10I, 13A-17D.

In certain embodiments the epoxy system further includes one or more of an accelerator, a crosslinker, a plasticizer, or an inhibitor, The accelerator, crosslinker, plasticizer, and/or inhibitor can be included with the hardener compound, the epoxy compound, or even as a separate component of the system. Examples of accelerators, crosslinkers, plasticizers, and inhibitors ions are shown in FIGS. 10A-10I and 16A-16F.

In certain embodiment, the epoxy system further includes an ionic hydrophobic and/or super-hydrophobic compound. In embodiments, the ionic hydrophobic and/or super-hydrophobic compound can be provided with either or both of the epoxy and hardener compound, for example as counter ion A, the epoxy compound, for example as a counter ion B, or both for example as a counter ion A and a counter ion B. In embodiments, the ionic hydrophobic and/or super-hydrophobic compound is released as an ionic liquid upon polymerization of hardener compound H and epoxy compound E to modify the properties of a polymer produced. Such ionic hydrophobic and/or super-hydrophobic compounds are known in the art and representative examples can found in FIGS. 5 and 6.

In certain embodiment, the epoxy system further includes an ionic hydrophilic compound. In embodiments, the ionic hydrophilic compound can provided with either or both of the hardener compound, for example as counter ion A, the epoxy compound, for example as a counter ion B, or both for example as a counter ion A and a counter ion B. In embodiments, the ionic hydrophilic compound is released as an ionic liquid upon polymerization of hardener compound H and epoxy compound E to modify the properties of a polymer produced. Such ionic hydrophilic compounds are known in the art.

In certain embodiment, the epoxy system further includes an ionic transitional hydrophobic/hydrophilic compound. In embodiments, the ionic transitional hydrophobic/hydrophilic compound can provided with either or both of the hardener compound, for example as counter ion A, the epoxy compound, for example as a counter ion B, or both for example as a counter ion A and a counter ion B. In embodiments, the ionic transitional hydrophobic/hydrophilic compound is released as an ionic liquid upon polymerization of hardener compound H and epoxy compound E to modify the properties of a polymer produced. Such ionic transitional hydrophobic/hydrophilic compounds are known in the art and representative examples can found in FIG. 7.

In certain embodiment, the epoxy system further includes a biological active (BAIL, Biological Active Ionic Liquid) compound. In embodiments, the biological active (BAIL, Biological Active Ionic Liquid) compound can provided with either or both of the hardener compound, for example as counter ion A, the epoxy compound, for example as a counter ion B, or both for example as a counter ion A and a counter ion B. In embodiments, the biological active (BAIL, Biological Active Ionic Liquid) compound is released as an ionic liquid upon polymerization of hardener compound H and epoxy compound E to modified the properties of a polymer produced. Such biological active (BAIL, Biological Active Ionic Liquid) compounds are known in the art and representative examples can found in FIGS. 8, 9A-9F, and 15A-15F.

In certain embodiment, the epoxy system further includes a plasticizer compound. In embodiments, the plasticizer compound can provided with either or both of the hardener compound, for example as counter ion A, the epoxy compound, for example as a counter ion B, or both for example as a counter ion A and a counter ion B. In embodiments, the plasticizer compound is released as an ionic liquid upon polymerization of hardener compound H and epoxy compound E to modify the properties of a polymer produced. Such plasticizer compounds are known in the art and representative examples can found in FIGS. 16A-16F. In certain embodiments, the plasticizer compound has a low to zero volatility.

Scheme 1

Scheme 1 shows examples of polymerization reactions between a first compound and a second compound each including a respective ionic moiety group and a corresponding counter-ion, in accordance with disclosed embodiments.

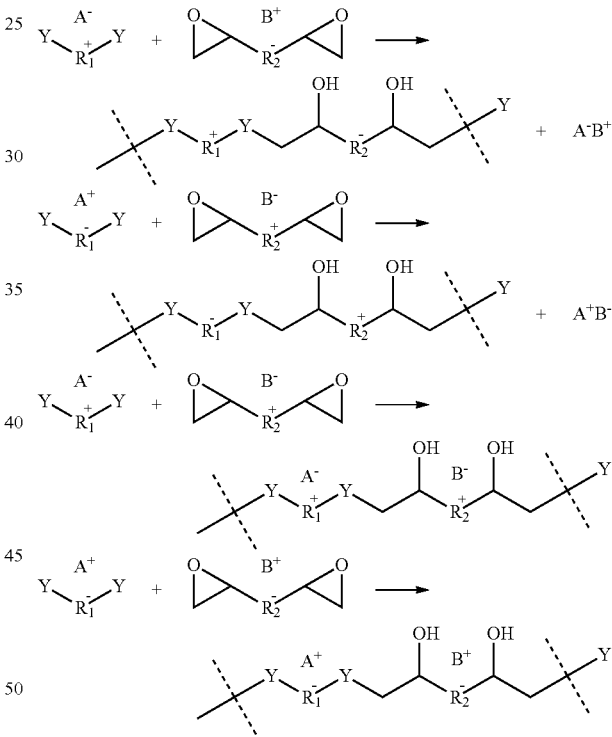

Scheme 1. Simplified polymerization reactions for epoxide systems.

More particularly, scheme 1 illustrates examples of a disclosed epoxy system according to an embodiment. As shown, the epoxy system includes a hardener compound H and an epoxy compound E. As depicted, the hardener compound H includes a cationic molecular structure ($Y^1$—$R_1$—$Y^2$) containing an ionic moiety group $R_1$ and the $Y^1$ and $Y^2$ groups bonded, for example chemically bonded to $R_1$. As shown in the first reaction, the hardener compound H further includes an anionic portion $A^-$, for example, a counter ion, in conjunction with the cationic molecular structure ($Y^1$—$R_1$—$Y^2$) at $R_1$. As shown, the epoxy compound E has an anionic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes a cationic portion $B^+$ in conjunction with the anionic molecular structure ($Z^1$—$R_2$—$Z^2$), for example, acting as a counter ion to at $R_2$. As shown in the second reaction, the hardener compound H further includes an anionic portion $A^+$, for example, a counter ion, in conjunction with the anionic molecular structure ($Y^1$—$R_1$—$Y^2$) at $R_1$. As shown, the epoxy compound E has a cationic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes an anionic portion $B^-$ in conjunction with the anionic molecular structure ($Z^1$—$R_2$—$Z^2$), for example, acting as a counter ion to at $R_2$. As shown in the third reaction, the hardener compound H further includes an anionic portion $A^-$, for example, a counter ion, in conjunction with the cationic molecular structure ($Y^1$—$R_1$—$Y^2$) at $R_1$. As shown, the epoxy compound E has a cationic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes an anionic portion $B^-$ in conjunction with the anionic molecular structure (Z—$R_2$—Z), for example, acting as a counter ion to at $R_2$. As shown in the fourth reaction, the hardener compound H further includes a cationic portion $A^+$, for example, a counter ion, in conjunction with the cationic molecular structure ($Y^1$—$R_1$—$Y^2$) at $R_1$. As shown, the epoxy compound E has a cationic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes a cationic portion $B^+$ in conjunction with the anionic molecular structure ($Z^1$—$R_2$—$Z^2$), for example, acting as a counter ion to at $R_2$.

Unless otherwise indicated, "anionic"—as used as used in the particular context of "anionic molecular structure," "anionic portion," "anionic moiety group," or the like—refers to the characteristic of an atom or molecular structure (e.g., a molecule or portion thereof) providing a negative charge to facilitate bonding with a positive charge of a counterpart "cationic" structure/portion/group. For example an anionic portion $A^-$ can be bonded to ionic moiety group $R_1$ by an ionic bond (e.g., where $A^-$ is a single atom) or by an intermolecular bond, for example. Alternatively or in addition a cationic portion $B^+$ can be bonded to ionic moiety group $R_2$ by an ionic bond (e.g., where $B^+$ is a single atom) or by an intermolecular bond. In another example an cationic portion $A^+$ can be bonded to ionic moiety group $R_1$ by an ionic bond (e.g., where $A^+$ is a single atom) or by an intermolecular bond, for example. Alternatively or in addition a anionic portion $B^-$ can be bonded to ionic moiety group $R_2$ by an ionic bond (e.g., where $B^-$ is a single atom) or by an intermolecular bond.

In the example reaction pathway shown in scheme 1, $Y^1$ and/or $Y_2$ can be a nucleophilic group—e.g., including but not limited to, —$NH_2$, —SH, —OH, —SeH, —$PH_2$ or other nucleophilic substituent. In a molecular structure ($Y^1$—$R_1$—$Y^2$), at least one such Y group can be reactive with an epoxide group of molecular structure ($Z^1$—$R_2$—$Z^2$) to for a stable chemical bond—e.g., a dimer formation—in a completed polymerization reaction.

Table 1 shows examples of molecular structures that can be variously utilized in respective ionic liquid epoxy systems. It is noted that superscripted numbers (e.g., $R^1$, $R^2$, $R^3$, $R^4$, etc.) are used herein to indicate component structure of a moiety group that, for example, is instead identified using subscripted numbers (e.g., $R_1$, $R_2$).

TABLE 1

Examples of possible structures for $R_1$ and $R_2$ in scheme 1

| Possible ($Y^1$-$R_1$-$Y^2$) structures | Possible ($Z^1$-$R_2$-$Z^2$) structures |
|---|---|
| 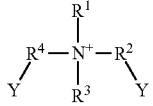 | 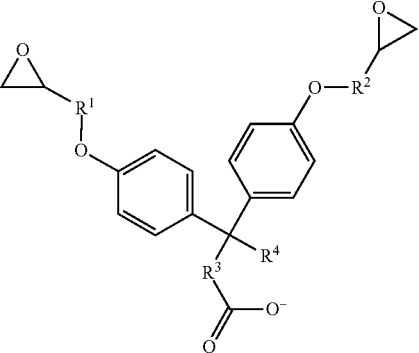 |
| 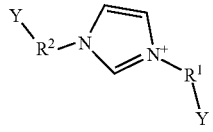 | 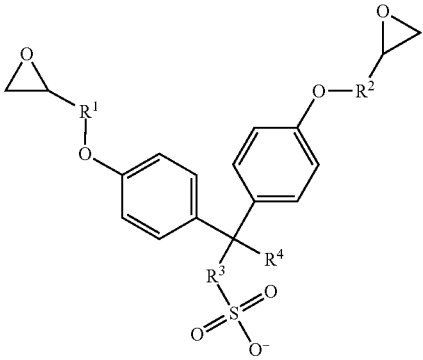 |

TABLE 1-continued

Examples of possible structures for $R_1$ and $R_2$ in scheme 1

| Possible ($Y^1$-$R_1$-$Y^2$) structures | Possible ($Z^1$-$R_2$-$Z^2$) structures |
|---|---|

TABLE 1-continued

Examples of possible structures for $R_1$ and $R_2$ in scheme 1

| Possible ($Y^1$-$R_1$-$Y^2$) structures | Possible ($Z^1$-$R_2$-$Z^2$) structures |
|---|---|
| 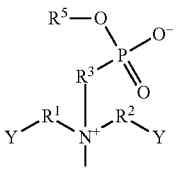 | 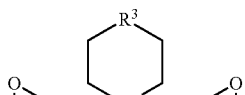 |
| | 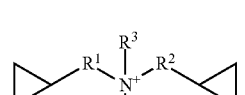 |
| | 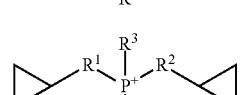 |

$R^1$, $R^2$, $R^3$ $R^4$ and $R^5$ could be any suitable chain, $Y^1$ and/or $Y^2$ could be a nucleophilic group—e.g., including but not limited to —$NH_2$, —SH, —OH, —SeH, —$PH_2$. $Y^1$ and/or $Y^2$ and epoxy moieties (epoxy group is an example of Z group that could be any electrophilic group suitable to react with $Y^1$ and/or $Y^2$ and form a permanent chemical bond) could be exchanged between $R_1$ and $R_2$. Anionic moieties could be any suitable anionic substituent.

As illustrated by the embodiment shown in scheme 1, the $Y^1$ and/or $Y^2$ groups bonded to ionic moiety group $R_1$ can be amine groups (e.g., where $Y^1$ and/or $Y^2$ is a primary amine group). The hardener compound H can function as a hardener to react with the epoxy compound E. A reaction of compounds H, E can result in at one of the epoxide groups forming a chain with one of the $Y^1$ and/or $Y^2$ groups—e.g., wherein a separate by-product molecule is formed by anionic portion $A^-$ and cationic portion $B^+$. Certain embodiments variously facilitate a wide variety of combinations of $R_1$, $R_2$, $Z^1$ and/or $Z^2$, $Y^1$ and/or $Y^2$, $A^-$, $A^+$, and $B^-$, and $B^+$ to be chosen from to achieve desired material characteristics, while providing significantly reduced VOC byproducts.

In the example embodiments shown in scheme 1, the first compound includes an ionic moiety group $R_1$ and a corresponding counter-ion A, while the second compound includes an ionic moiety group $R_2$ and a corresponding counter-ion B. The illustrative reaction pathway shown in scheme 1 represents examples of dimer formation from a polymerization reaction.

Various combinations of ionic moieties $R_1$ and $R_2$ groups are possible, and if the corresponding counter-ions (A and B) are carefully selected, the two compounds can form a secondary ionic liquid ($A^-$ $B^+$), limiting or even avoiding the possibility of VOC emissions from an ionic liquid epoxy system. Also is possible to use same charge ionic liquid resin and ionic liquid hardener where a secondary ionic liquid will not be produce but permanent charges remains in the polymeric chains compensate for the corresponding counter ions, as is shown in the last two examples in scheme 1.

Aspect of the present disclosure concern a polymer produced by the polymerization of the epoxide system disclosed herein. In embodiments, a polymer produced upon polymerization of hardener compound H and epoxy compound E comprises self-healing properties due to the presence of stable electrical charges along to the polymeric chains that drive the healing process through electrostatic attraction. In embodiments, a polymer produced upon polymerization of hardener compound H and epoxy compound E forms a highly and regular porous system, which could be used but not limited to as filtration membrane, solid electrolyte after replacing the secondary ionic liquid, exchange membrane, etc. In embodiments, a polymer comprises a solid electrolyte. An electronic component comprising the polymers disclosed herein. In embodiments, the electronic component is a component of a battery, a capacitor, a piezoelectric material and/or an electro-actuator.

Synthetic Methods
Scheme 2

Scheme 2 shows an example reaction to synthesize a hardener compound of an epoxy system according to embodiments disclosed herein. Such reactions can contribute to the manufacture of some or all of the hardener compounds H, for example, as shown in scheme 1.

As shown in scheme 2, the class of diamine imidazolium ionic liquids provide amine chemistry that can be used as a hardener in an epoxy polymer system, such as those disclosed herein. For example, the illustrative reactions of scheme 2 provide for synthesis of 1,3-di(2'-aminoethylene)-2-methylimidazolium bromide.

The first step of the synthesis is the protection of the amino group in bromo-ethylamine (1) using tritylchloride (2), and substituting the resulting compound (3) in 2-methylimidazole (4) under basic conditions (refluxing in DMF for 12 h) in order to obtain the bi-substituted intermediate (5), deprotection of amine groups is carried out in acidic media in dioxane to obtain the hydrochloride derivative (6), careful neutralization using NaOH is required in order to obtain the target compound (7).

Scheme 2. Synthesis of 1,3-di(2'-aminoethylene)-2-methylimidazolium bromide.

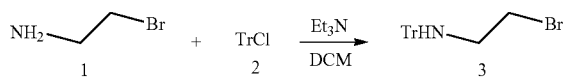

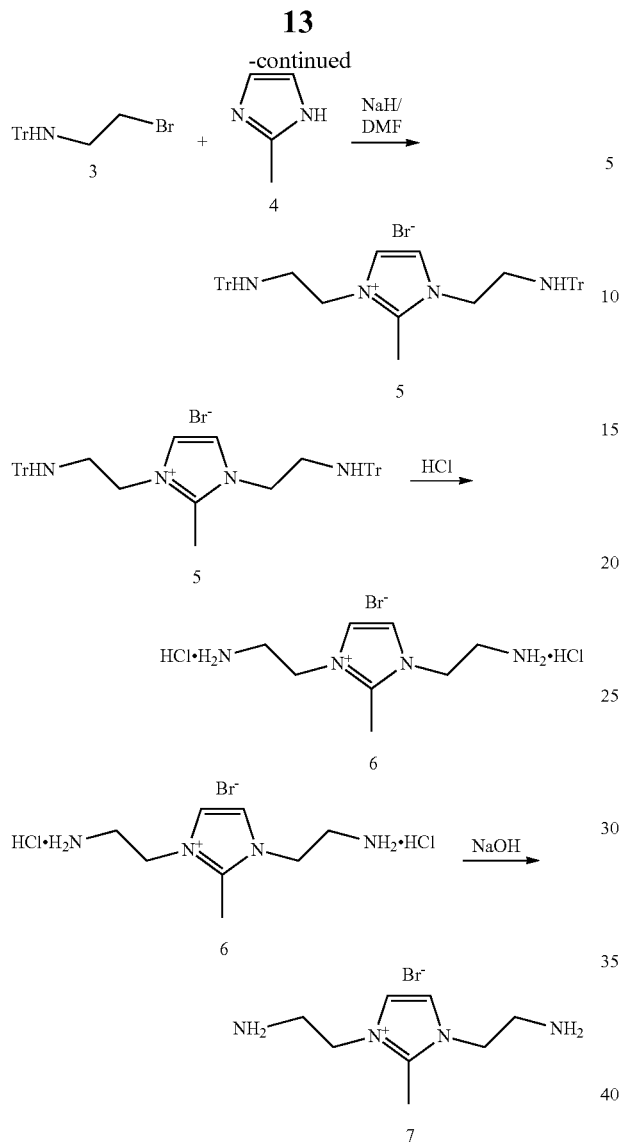

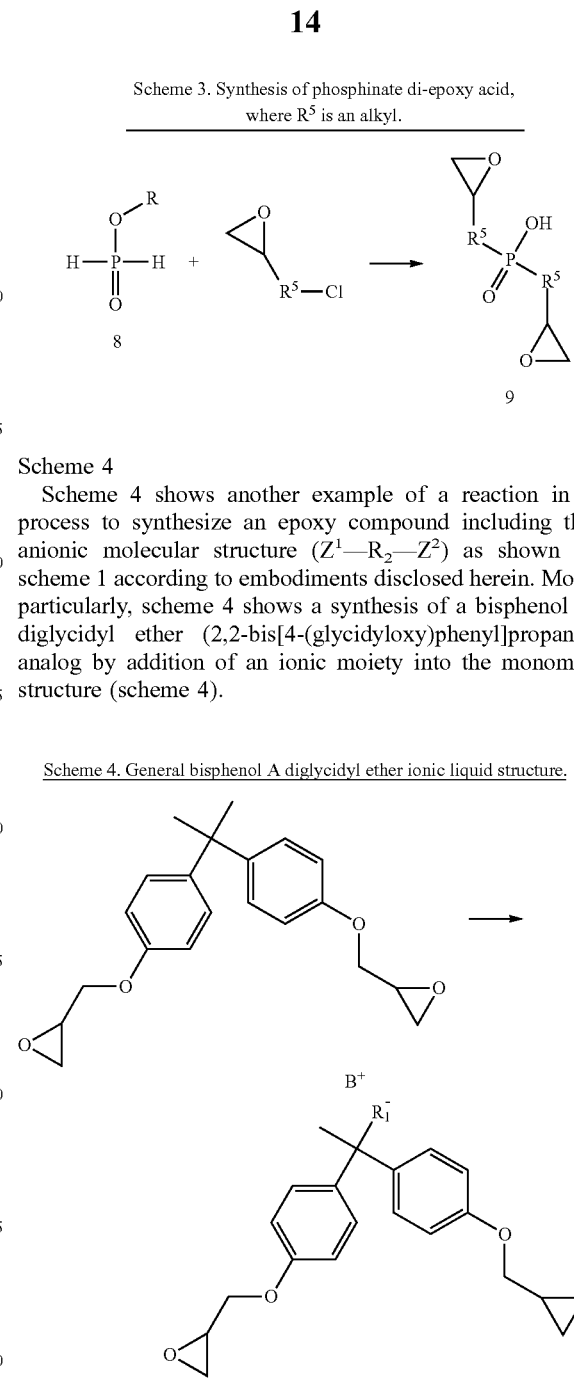

Scheme 3. Synthesis of phosphinate di-epoxy acid, where $R^5$ is an alkyl.

Scheme 4

Scheme 4 shows another example of a reaction in a process to synthesize an epoxy compound including the anionic molecular structure ($Z^1$—$R_2$—$Z^2$) as shown in scheme 1 according to embodiments disclosed herein. More particularly, scheme 4 shows a synthesis of a bisphenol A diglycidyl ether (2,2-bis[4-(glycidyloxy)phenyl]propane) analog by addition of an ionic moiety into the monomer structure (scheme 4).

Scheme 4. General bisphenol A diglycidyl ether ionic liquid structure.

Scheme 5

Figure 2:
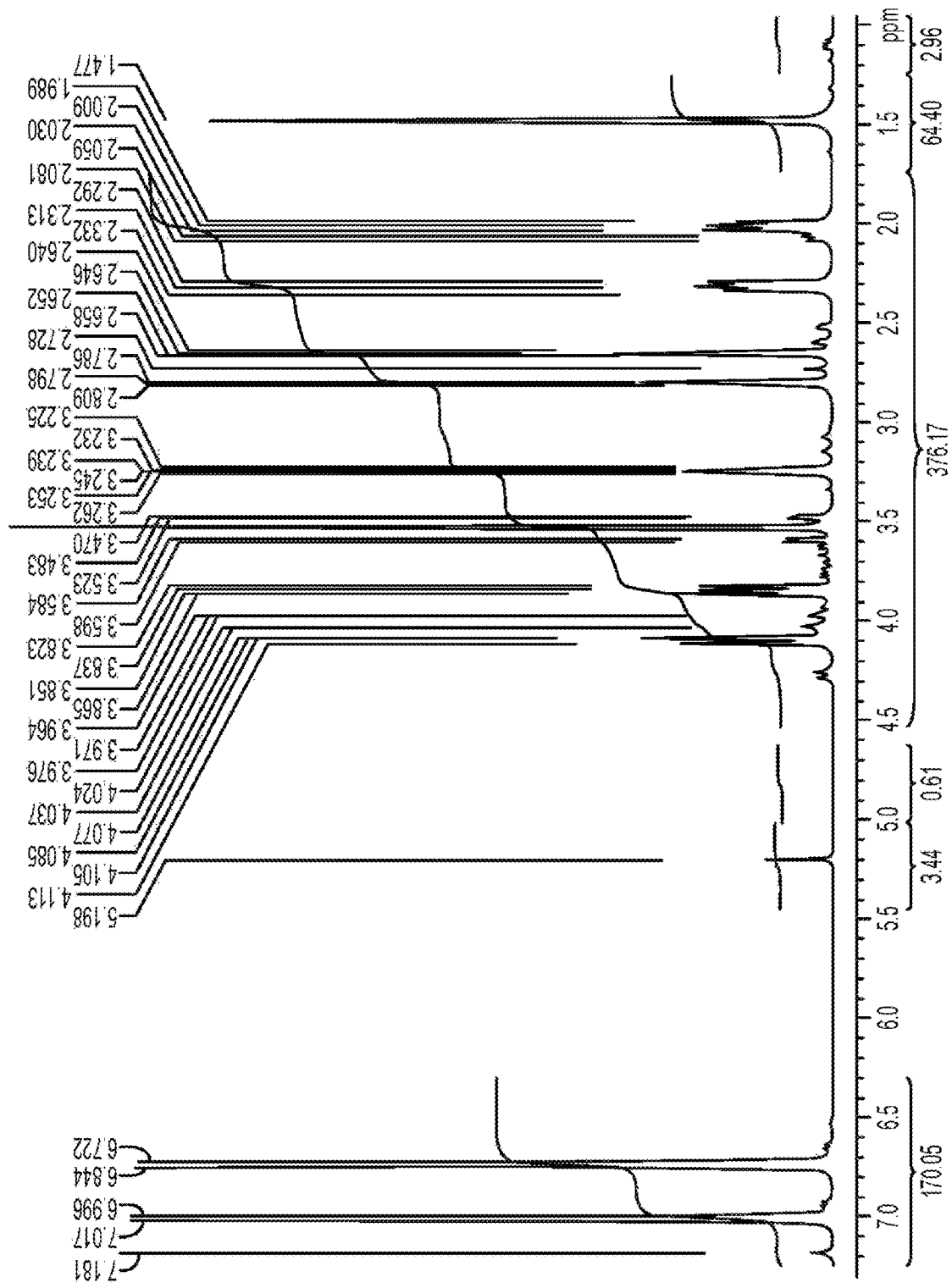
FIG. 2 is an example of a typical NMR spectra of, γ-methyl-4-(2-oxiranylmethoxy)-γ-[4-(2-oxiranylmethoxy)phenyl]-, methyl ester benzenebutanoic acid.

Scheme 5 shows another example of a reaction in a process to synthesize an epoxy compound including the anionic molecular structure $Z^1$—$R_2$—$Z^2$) as shown in scheme 1 according to embodiment disclosed herein. In the illustrative di-glycidylation reaction of scheme 5, 4-hydroxy-γ-(4-hydroxyphenyl)-γ-methyl-methyl ester benzenebutanoic acid (10) reacts with epichlorohydrin (11) in basic conditions at 100° C. for 15 minutes. Such a reaction can result in a yield above 90% of γ-methyl-4-(2-oxiranylmethoxy)-γ-[4-(2-oxiranylmethoxy) phenyl]-, methyl ester benzenebutanoic acid (12). A proton NMR analysis of a material resulting from one such reaction is shown in FIG. 2. FIG. 2 shows characteristic peaks indicating that compound (12) is the main component.

Full proton NMR spectroscopic characterization was obtained for the target compound (7) (see FIG. 1) showing proper peaks that correlate with expected characteristics. The material obtained is a highly viscous brown liquid. Additional studies indicate that stability of this hardener in a time window of 6 months (storage without inert atmosphere in a lab shelf, closed container) without signs of decomposition. An ionic liquid hardener including compound (7) was tested against commercially available resins (1:1 mass ratio), without accelerators or modifiers of the polymerization reaction. The testing revealed that the hardener was effective with a curing temperature of 120° C. for two hours producing a brown solid material.

Scheme 3 Scheme 3 shows an example of a reaction in a process to synthesize an epoxy compound including the anionic molecular structure ($Z^1$—$R_2$—$Z^2$) as shown in scheme 1 according to embodiments disclosed herein. As shown, synthesis of phosphinate di-epoxy acid can be produced using a modified Arbuzov reaction. In the example reaction shown in scheme 3, acidic compound (9) is neutralized with tetraakyl phosphonium hydroxide in order to obtain the corresponding phosphonium ionic liquid, where $R^5$ can be an alkyl, such as an alkyl having between 1 and 16 carbon atoms, such as 1, 2, 3, 4, 5, 6, 7, 8, 9, 10, 11, 12, 13, 14, 15, or 16.

Scheme 5. General procedure for di-glycidylation of 4-hydroxy-γ-(4-hydroxyphenyl)-γ-methyl-methyl ester benzenebutanoic acid.

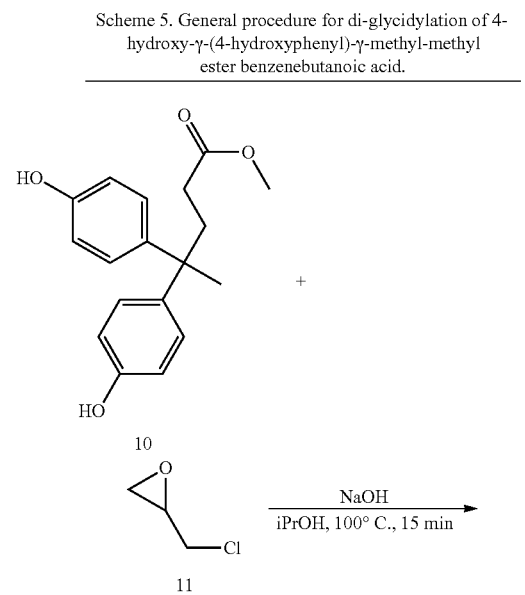

Scheme 6. General procedure for hydrolysis of -OMe group of γ-methyl-4-(2-oxiranylmethoxy)-γ-[4-(2-oxiranylmethoxy)phenyl]-, methyl ester benzenebutanoic acid.

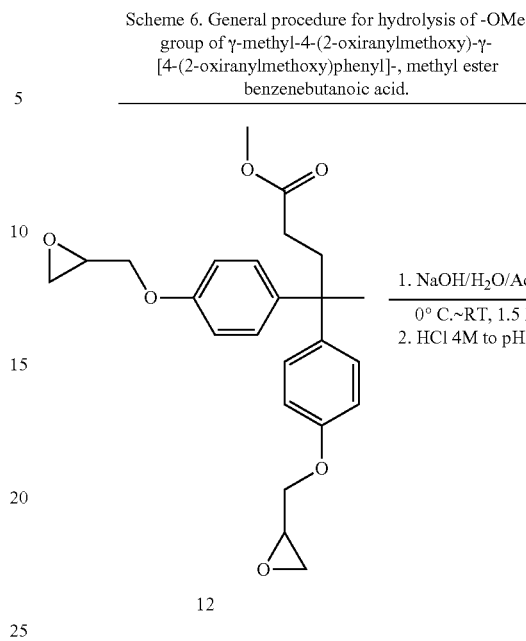

Scheme 6

Scheme 6 shows another example of a reaction in a process to synthesize an epoxy compound including the anionic molecular structure ($Z^1$—$R_2$—$Z^2$) as shown in scheme 1 according to embodiment disclosed herein. The reactions shown in scheme 6 can be continued from those shown in scheme 5, for example.

As shown in scheme 6, the —OMe (oxygen/methyl group) moiety can be hydrolyzed—e.g., without requiring further purification—using a NaOH (3 eq)/acetone/water mixed at 0° C. and allowed to warm up to room temperature for 1.5 h, (scheme 6). Extended reaction time does not show deviation from the desired product when the reaction was followed by TLC. The free acid derivative (13), γ-methyl-4-(2-oxiranylmethoxy)-γ-[4-(2-oxiranylmethoxy)phenyl]-benzenebutanoic acid was obtained in a quantitative yield and fully characterized by proton NMR in CDCl₃.

Figure 3:
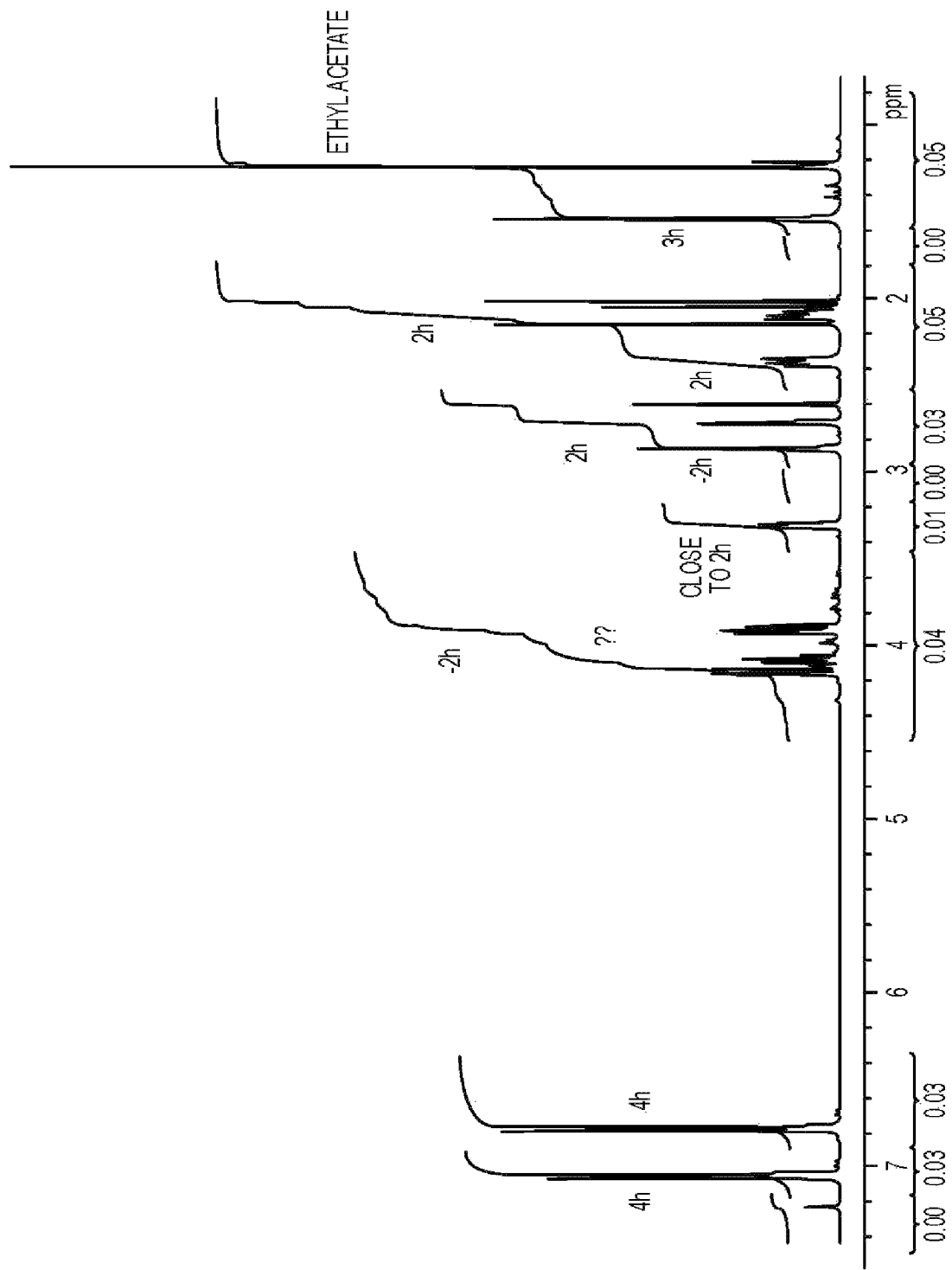
FIG. 3 is an example of a typical NMR spectra of γ-methyl-4-(2-oxiranylmethoxy)-γ-[4-(2-oxiranylmethoxy)phenyl]-Benzenebutanoic acid.

An example of a typical spectra obtained for compound (13) is shown in FIG. 3. FIG. 3 reveals all the characteristic features of compound (13). The NMR of the reaction product also shows the presence of the solvent (ethyl acetate) used during the purification process.

Scheme 7

Scheme 7 shows another example of a reaction in a process to synthesize an epoxy compound including the anionic molecular structure ($Z^1$—$R_2$—$Z^2$) as shown in scheme 1 according to embodiment disclosed herein. The reaction shown in scheme 7 can be continued from those shown in scheme 6, for example. In order to mitigate the possible of damaging the epoxy groups in compound (13), the ionic liquid formation can be carried out in methanol, using equimolar amounts of tetrabutyl phosphonium hydroxide (14) to neutralized the benzenebutanoic acid proton (scheme 7), and quickly removing the MeOH (15 minutes mixing time) and produced water under vacuum (30 mmHg) at 45° C. during 4 h and dried at room temperature and full vacuum for 24 h. In a test run of such a process, a dark yellow viscous liquid was obtained.

Scheme 7. General procedure for the synthesis of Tetrabutylphosphonium γ-methyl-4-(2-oxiranylmethoxy)-γ-[4-(2-oxiranylmethoxy)phenyl]-benzenebutanoate.

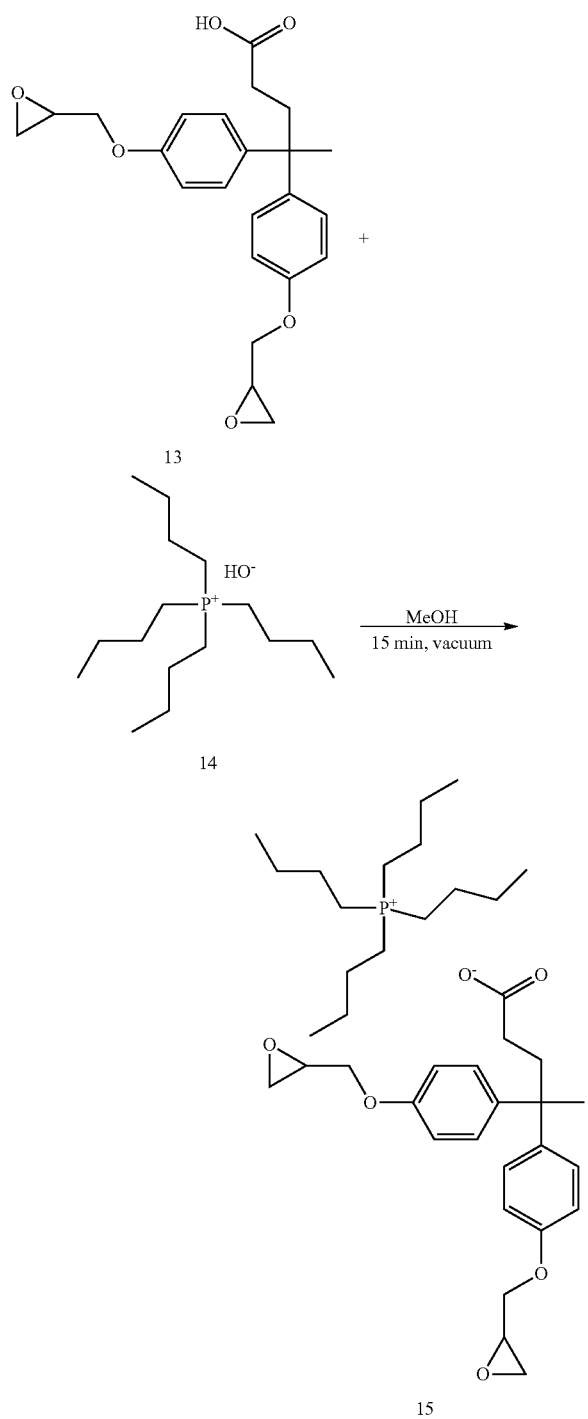

ness. It was theorized that such properties might be related to relatively low amounts of crosslinking agents in the epoxy system. In order to probe this assumption, a new ionic liquid hardener was prepared. Secondary ionic liquid produce during the polymerization process is tetrabutylphosphonium bromide Scheme 8

Scheme 8 shows an example of a reaction in a process to synthesize an epoxy compound of aliphatic nature: tetrabutylphosphonium salt of 2,2-bis(glycidyloxymethyl)propionic acid (21). The synthetic route includes 3 steps: alkylation of commercially available 2,2-bis(hydroxymethyl) propionic acid (16) with allyl bromide (17) in toluene with NaOH. This reaction requires overnight reflux for completion and produce diallyl intermediate (18) in 90% yield. The product is quite pure and does not require further purification for the next step. Oxidation the olefinic intermediate (18) to epoxide (20) was conducted by a standard method with m-chloroperbenzoic acid (19) at room temperature overnight. This method requires tedious column purification, but is safe and gives 90% yield of epoxidized product (20). Formation of the target ionic liquid epoxy resin (21) was carried out in methanol with equimolar amounts of tetrabutylphosphonium hydroxide (14), by a similar method described for compound (15) on Scheme 7.

Scheme 8. Synthesis of tetrabutylphosphonium 2,2-bis(glycidyloxymethyl)propionate

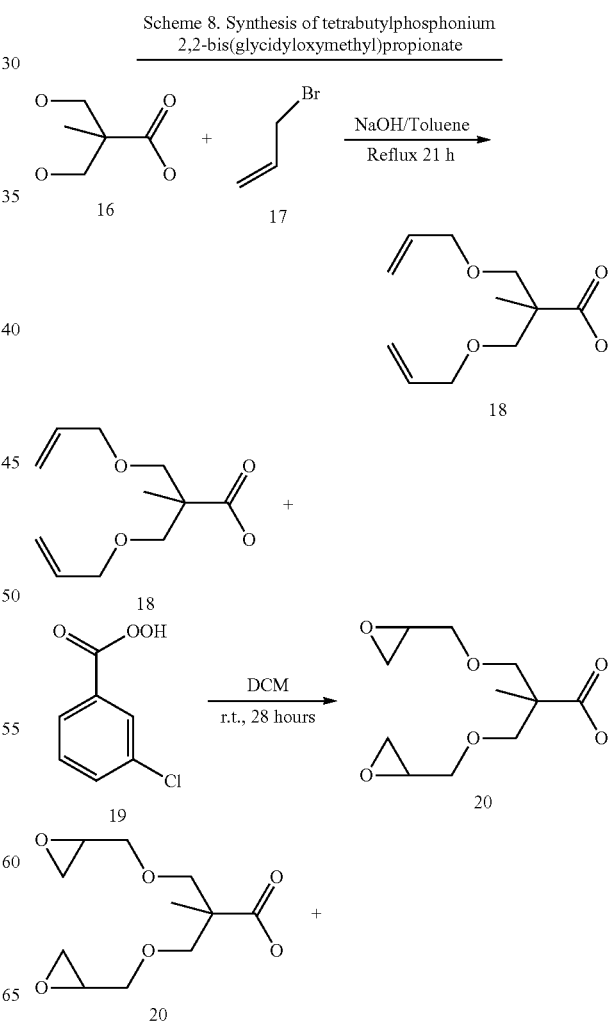

In embodiments, equimolar amounts of the compound (15) ionic liquid resin and the compound (7) ionic liquid hardener can be combined—e.g., mixed manually at room temperature and poured into a 1.5 ml silicon mold, and placed overnight in a vacuum oven at 120° C. for 12 h. Reaction of the combined compounds (7) and (15) result in a solid material with a greasy feature and rubber-like tough-

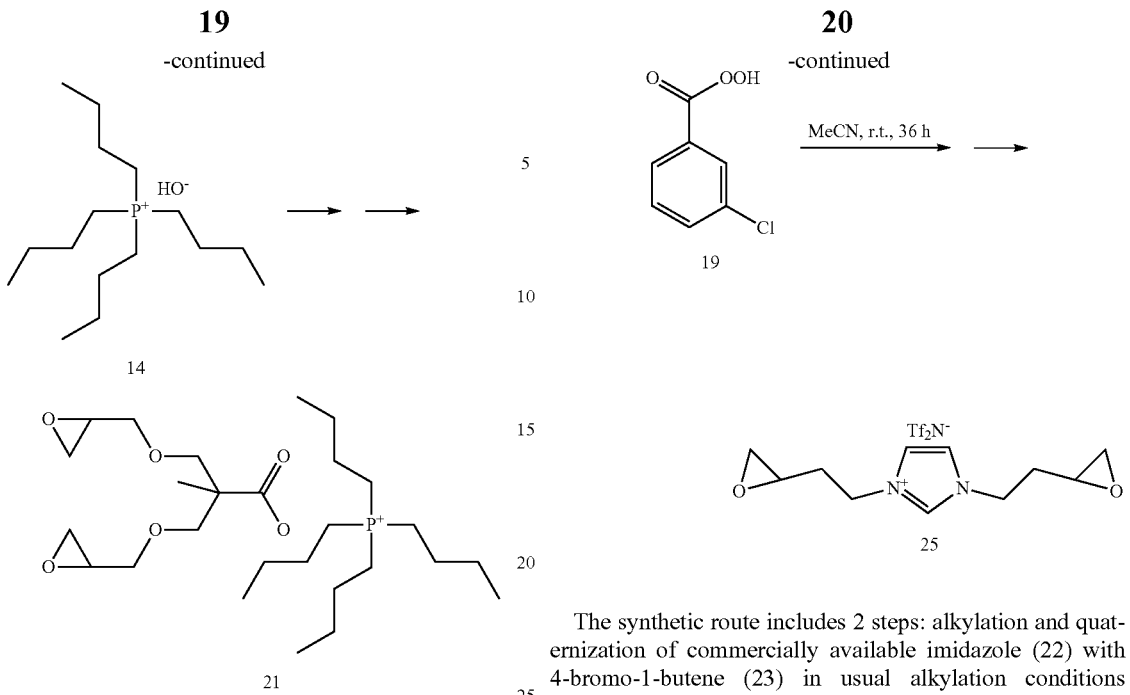

Scheme 9

Scheme 9 shows an example of a reaction in a process to synthesize an epoxy compound with positively charged heterocyclic core. Such epoxy ionic resin can react either with a negatively charged hardener (second line in Scheme 1) or with similarly positive hardener (third line in Scheme 1). In the case of both positively charged components (third line) no additional ionic liquid of AB type is formed, which can be useful for certain properties.

Scheme 9. Example: synthesis of 1,3-bis(2-oxiranylethyl) imidazolium bis(trifluoromethane) sulfonimide

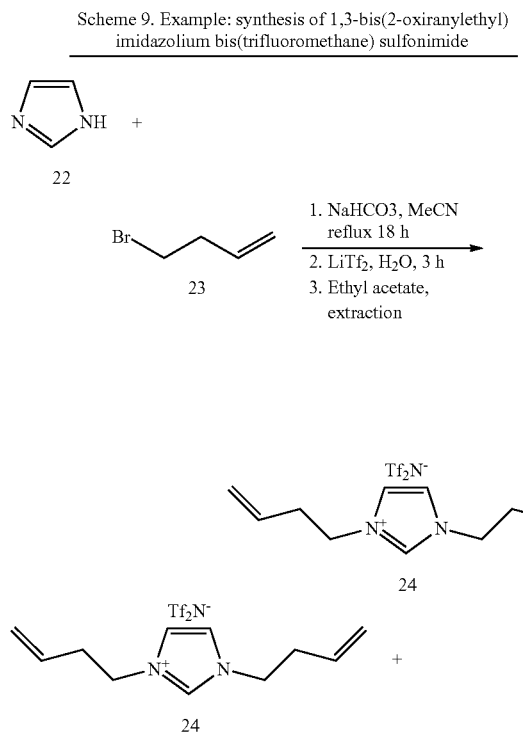

The synthetic route includes 2 steps: alkylation and quaternization of commercially available imidazole (22) with 4-bromo-1-butene (23) in usual alkylation conditions (NaHCO$_3$-acetonitrile, reflux overnight). The quaternized intermediate (24) was obtained in 99%. The crude product was pure enough and was used for the next step without additional purification. Epoxidation of the olefinic quaternized intermediate (24) was conducted under a standard method with m-chloroperbenzoic acid (19) at room temperature overnight. As in the analogous case with aliphatic epoxy ionic resin (Scheme 8, compound 20), the product required tedious column purification. The final yield was about 50%.

Scheme 10

Scheme 10 shows an example of reactions in a process to synthesize a hardener compound of an epoxy system according to an embodiment. In this example embodiment, the new hardener is intended to have a multi-branch structure in order to promote crosslinking between the polymeric chains. N1, N1-bis(2-aminoethyl)-1,2-ethanediamine (compound 26, scheme 10) was protected using a BOC (e.g., tert-butyloxycarbonyl) protecting group under room temperature conditions and overnight stirring. Protected compound (28) was then alkylated using methyl iodide at 120° C. in acetonitrile reflux with overnight stirring, the alkylation reaction was followed by TLC until the complete consumption of (28), solvent and MeI (methyl iodide) excess were remove by rotary evaporation at 45°-50° C. and 30 mmHg during 4 h, followed by drying at room temperature and full vacuum. It is important to mention that MeI alkylation agent was selected due to facile access to the reagent, but there are several options to choose from and the final selection could be used to modify the properties of the whole epoxy resin system. BOC protection was removed using HCl-dioxane solution and the remaining acid was neutralized using NaOH. After this step the final ionic liquid was obtained by metathesis of the ionic liquid in an aqueous solution of LiTFSI, inorganic salts were removed by several washes with nanopure water and rotary evaporation at 50° C. and 15 mmHg for 4 h. Compound (30) 2-amino-N, N-bis(2-aminoethyl)-N-methyl-ethanaminium bis(trifluoromethane) sulfonamide was obtained as a viscous white liquid, dried for 24 h at room temperature and full vacuum.

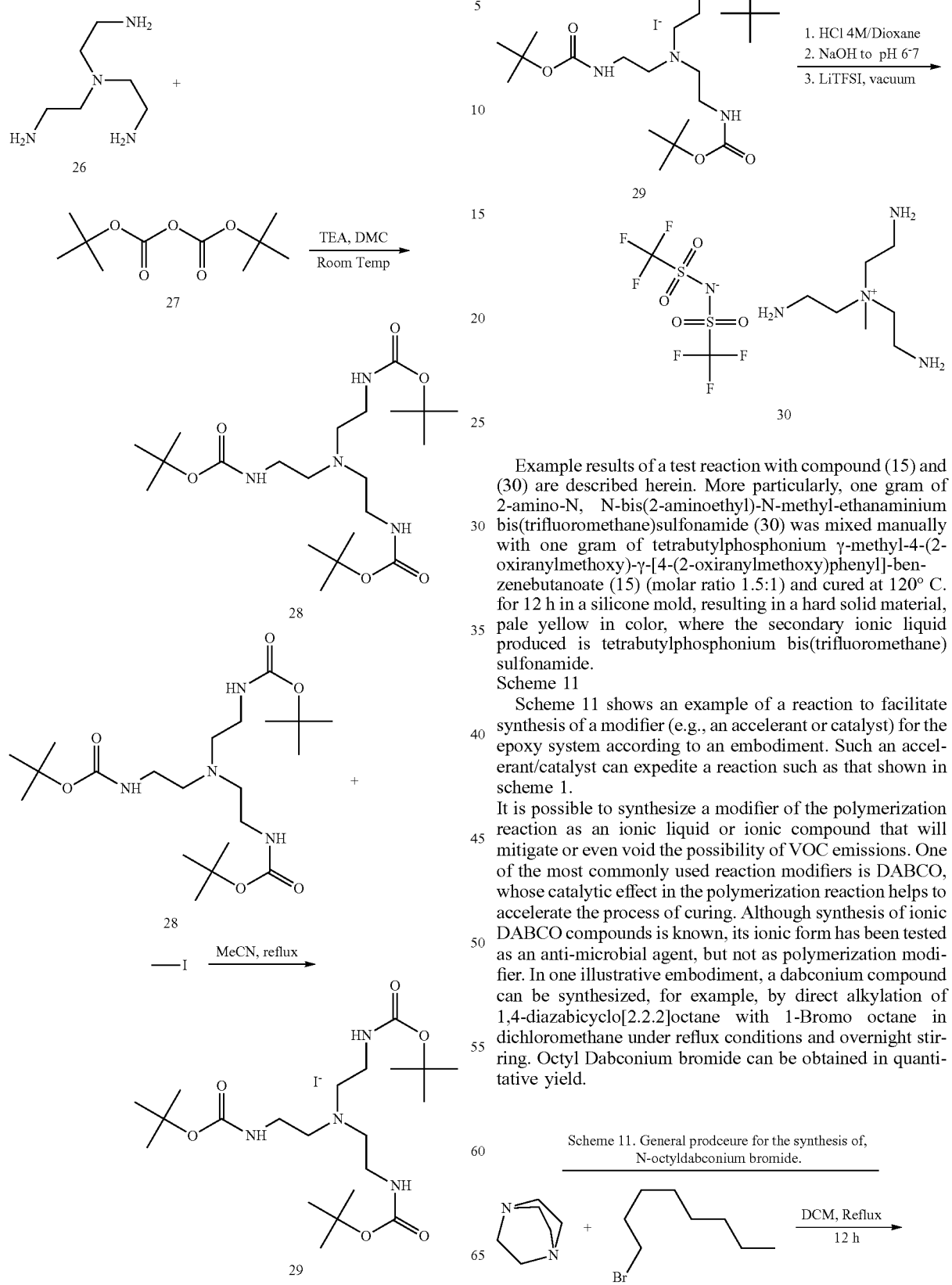

Example results of a test reaction with compound (15) and (30) are described herein. More particularly, one gram of 2-amino-N, N-bis(2-aminoethyl)-N-methyl-ethanaminium bis(trifluoromethane)sulfonamide (30) was mixed manually with one gram of tetrabutylphosphonium γ-methyl-4-(2-oxiranylmethoxy)-γ-[4-(2-oxiranylmethoxy)phenyl]-benzenebutanoate (15) (molar ratio 1.5:1) and cured at 120° C. for 12 h in a silicone mold, resulting in a hard solid material, pale yellow in color, where the secondary ionic liquid produced is tetrabutylphosphonium bis(trifluoromethane) sulfonamide.

Scheme 11

Scheme 11 shows an example of a reaction to facilitate synthesis of a modifier (e.g., an accelerant or catalyst) for the epoxy system according to an embodiment. Such an accelerant/catalyst can expedite a reaction such as that shown in scheme 1.

It is possible to synthesize a modifier of the polymerization reaction as an ionic liquid or ionic compound that will mitigate or even void the possibility of VOC emissions. One of the most commonly used reaction modifiers is DABCO, whose catalytic effect in the polymerization reaction helps to accelerate the process of curing. Although synthesis of ionic DABCO compounds is known, its ionic form has been tested as an anti-microbial agent, but not as polymerization modifier. In one illustrative embodiment, a dabconium compound can be synthesized, for example, by direct alkylation of 1,4-diazabicyclo[2.2.2]octane with 1-Bromo octane in dichloromethane under reflux conditions and overnight stirring. Octyl Dabconium bromide can be obtained in quantitative yield.

-continued

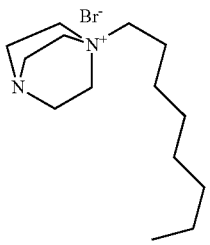

One advantage of this approach to epoxy technology is the possibility of tuning the properties of the ionic liquid produced during the polymerization reaction in order to give to the final product different characteristics according to the specific use of each material. This in-situ modifier could be designed to be hydrophobic or hydrophilic, to act as a plasticizer of the polymer network and/or to be solidified to act as filler. Alternatively or in addition, such an in-situ modifier can be adapted for use in providing an antibacterial ionic liquid for medical use.

Example Compounds and Epoxy Systems

Figure 4:
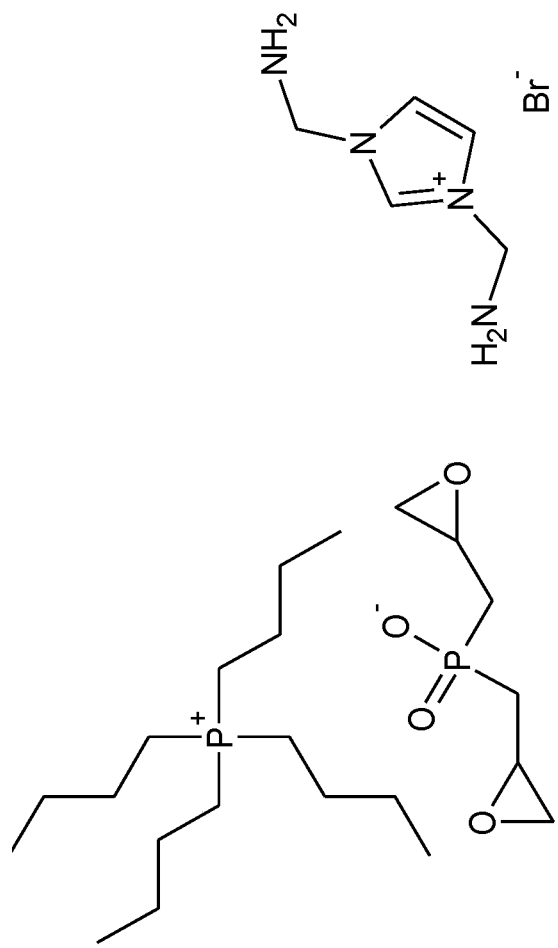
FIG. 4 shows the chemical structures of examples of solvent-less ionic liquid epoxy resin and hardener, in accordance with embodiments disclosed herein.

FIG. 4 shows an example of an epoxy system, according to an embodiment, that includes some or all of the features of that shown in scheme 1. More particularly, FIG. 4 shows one example of a system including a solvent-less epoxy resin (diepoxy phosphinate tetrabutylphosphonium) and hardener (dimethyl amine imidazolium bromide). When a polymerization reaction of such a system is complete, a resulting ionic liquid obtained as a by-product can include tetrabutylphosphonium bromide, which in turn can be used—for example—as plasticizer of a polymerized phosphinate/dimethylamine imidazolium network.

Figure 5:
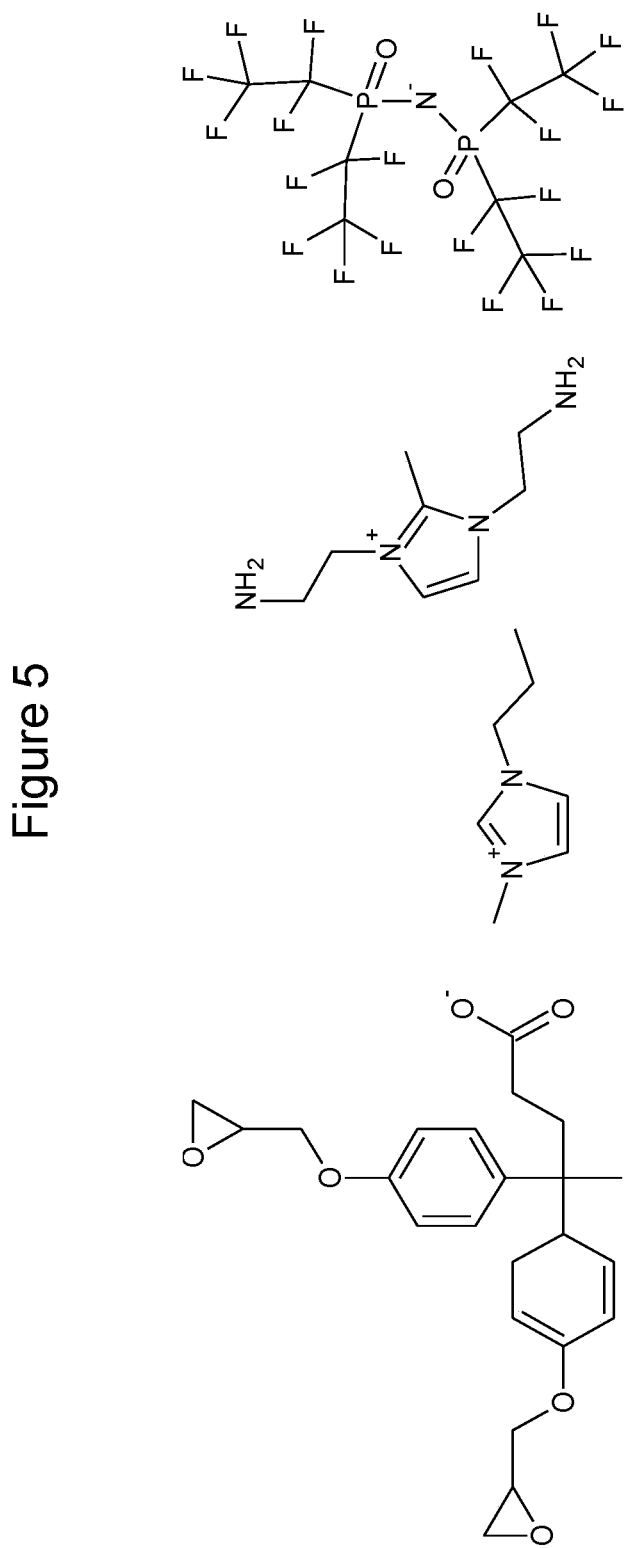
FIG. 5 shows the chemical structures of an example of an ionic liquid epoxy system including a super-hydrophobic anionic portion that produces a super-hydrophobic material after the polymerization reaction, in accordance with embodiments disclosed herein.

FIG. 5 shows an example of an epoxy system, according to an embodiment, that includes some or all of the features of that shown in scheme 1. More particularly, FIG. 5 shows one example of a possible solvent-less ionic liquid epoxy system. If, for example, a user requires a polymer with a super hydrophobic surface it is possible to design the hardener and resin to produce a super hydrophobic ionic liquid after the polymerization reaction happens, as the case of imidazolium bis[bis(pentafluoroethyl)phosphinyl]imide ionic liquids, where the anionic portion is the hydrophobic part of the ionic liquid. One such ionic liquid epoxy system is shown in FIG. 5.

Figure 6:
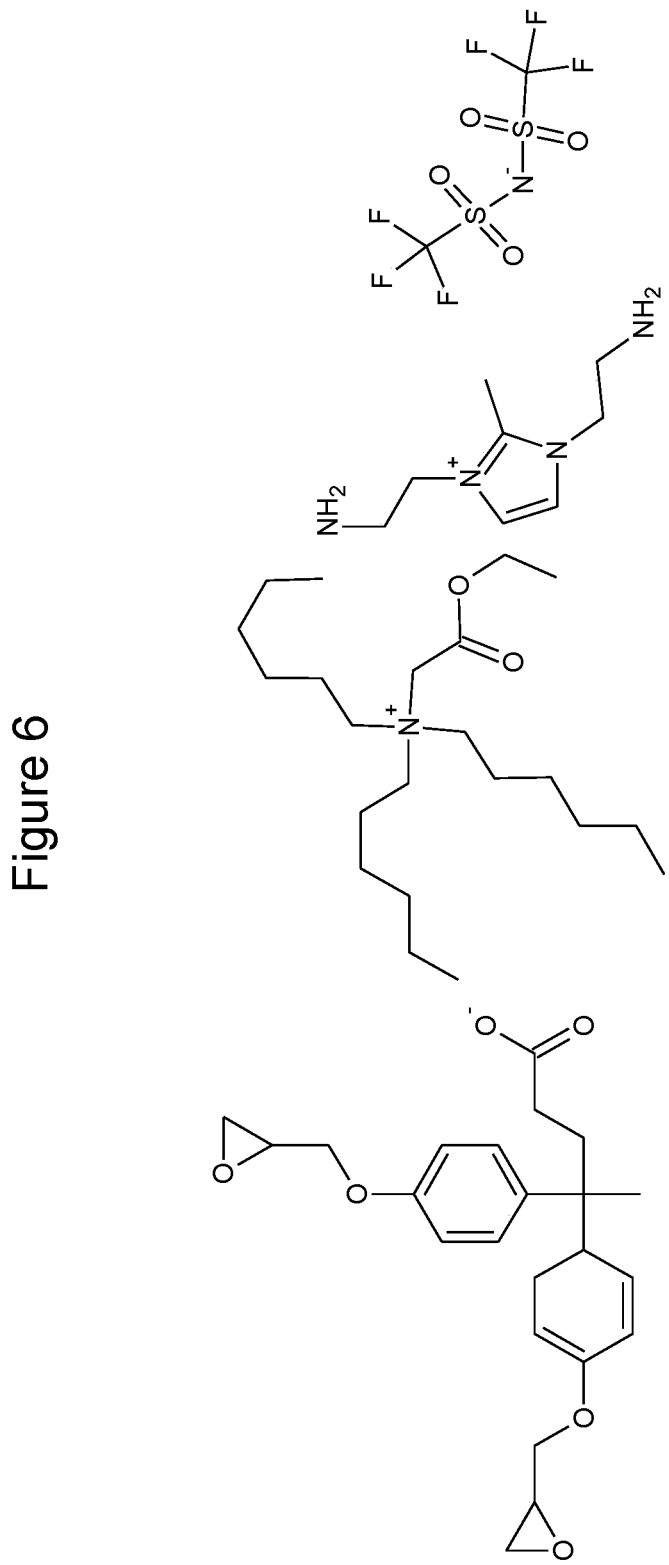
FIG. 6 shows the chemical structures of an example ionic liquid epoxy system including a super-hydrophobic cation that produces a super-hydrophobic material after the polymerization reaction, in accordance with embodiments disclosed herein.

FIG. 6 shows an example of an epoxy system, according to an embodiment, that includes some or all of the features of that shown in scheme 1. More particularly, FIG. 6 illustrates an alternative use of super-hydrophobic cations such as Tri(n-hexyl)[2-ethoxy-2-oxoethyl]ammonium.

Figure 7:
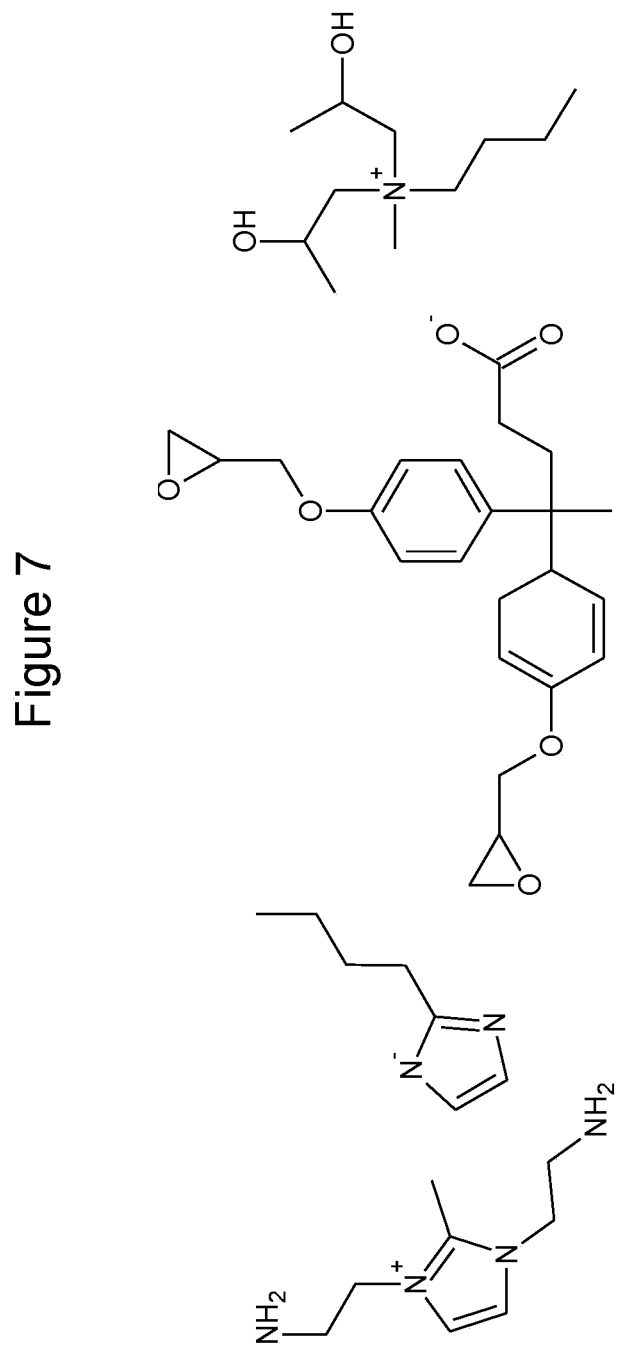
FIG. 7 shows the chemical structures of an ionic liquid epoxy system that produces a transitional hydrophobic-hydrophilic material after the polymerization reaction, in accordance with embodiments disclosed herein.

FIG. 7 shows an example of an epoxy system, according to an embodiment, that includes some or all of the features of that shown in scheme 1. In the case of the example embodiment shown in FIG. 7, the hydrophobic-hydrophilic character of the final product can be tuned and can be modified after the polymerization process using ionic liquids with a transitional hydrophobicity. In this case the hydrophobicity is modified by the presence of carbon dioxide. In $CO_2$ free environments this kind of ionic liquid has hydrophobic behavior. When the material is exposed to $CO_2$ the ionic liquid suffers a transition to a hydrophilic condition. This phenomenon is reversible and could provide a tunable material even after the curing of the epoxy resins. The same behavior has been observed in anionic portions derived from pyrazole, imidazole and triazole.

Figure 8:
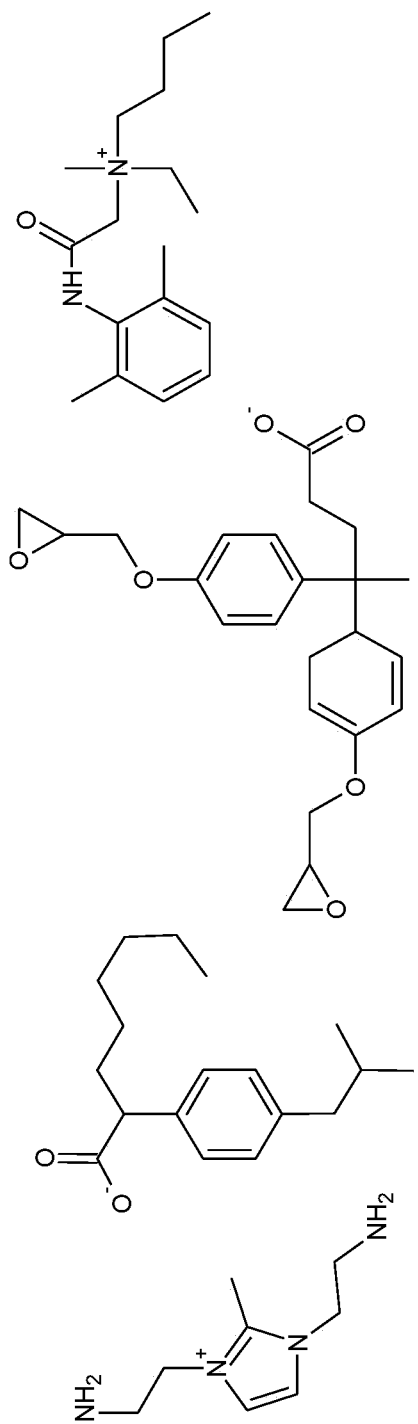
FIG. 8 shows the chemical structures of an ionic liquid epoxy system that includes a pharmaceutically active anion and cation and produces a medication release material after the polymerization reaction, in accordance with embodiments disclosed herein.
Figure 9C:
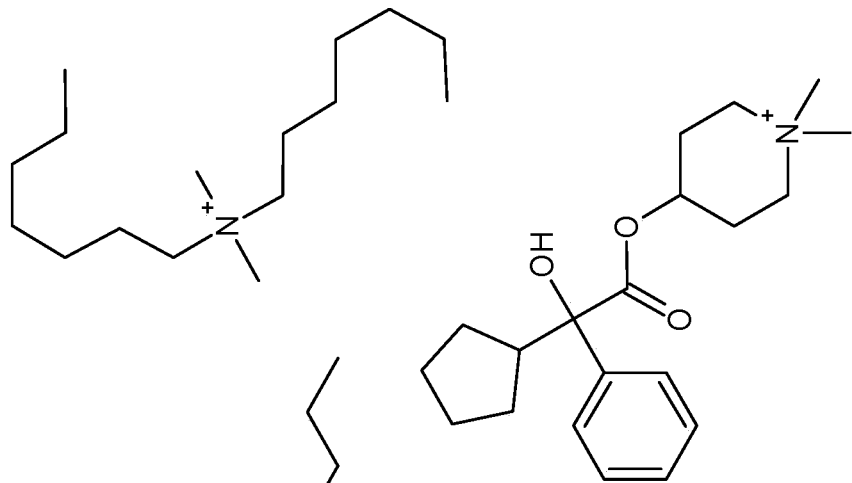
FIGS. 9A-9F show the chemical structures of exemplary pharmacological active ions for the solvent-less ionic liquid epoxy resins, FIG. 9A) anti-histamic, FIG. 9B) emollient, FIG. 9C) anti-inflammatory, FIG. 9D) pain reliever, FIG. 9E) anti-inflammatory and FIG. 9F) anti-cholinergic, in accordance with embodiments disclosed herein.
Figure 9F:
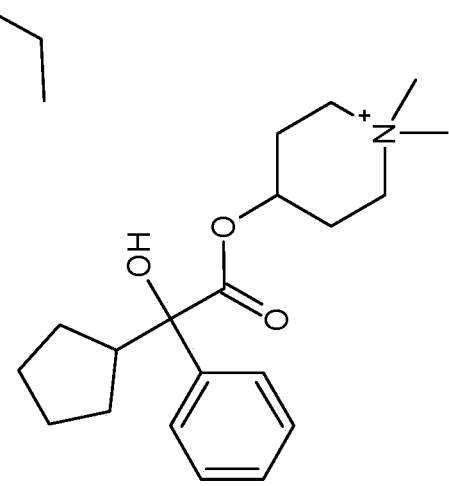
Figure 9B:
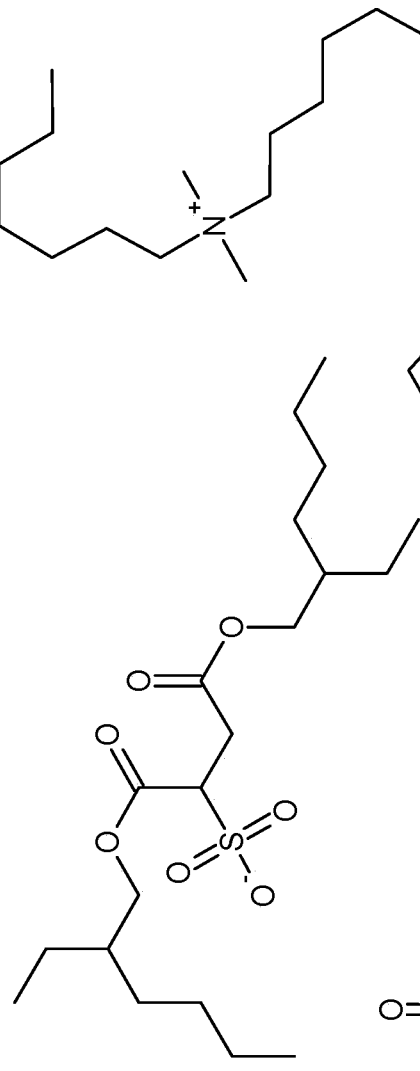
Figure 9E:
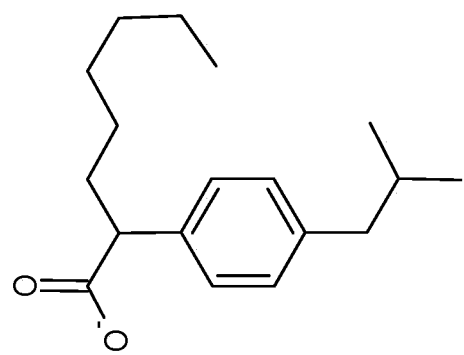
Figure 9A:
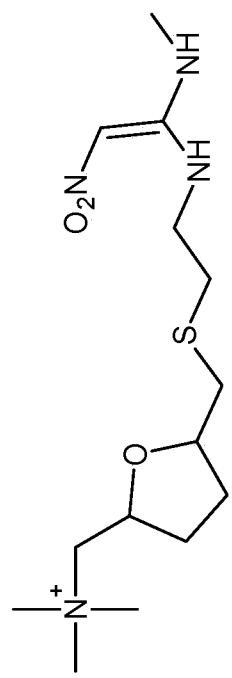
Figure 9D:
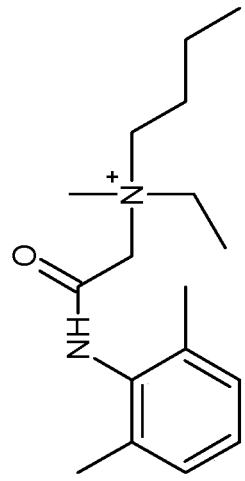
Figure 10I:
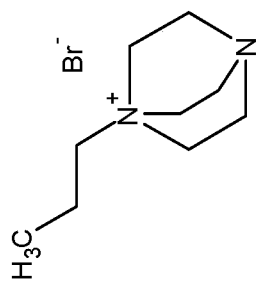
Figure 10H:
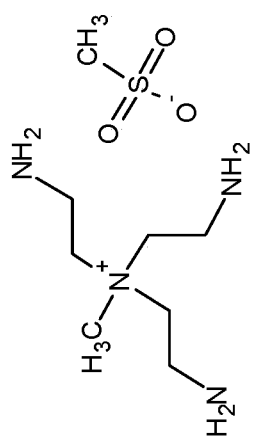
Figure 10G:
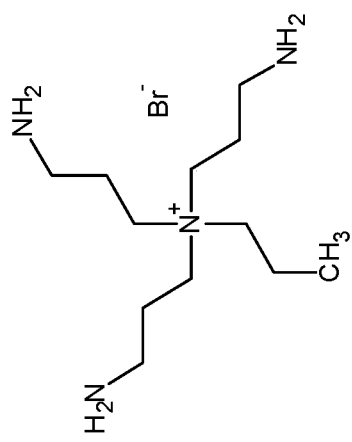

FIG. 8 shows an example of an epoxy system, according to an embodiment, that includes some or all of the features of that shown in scheme 1. The production of a secondary ionic liquid, after the curing process, can be useful in various medical, pharmaceutical and/or other important fields of application for ionic liquid epoxy resins. Some embodiments variously provide a long term release system for medication—e.g., using pharmacologically active ionic liquids such as the ones derived from ibuprofenate and lidocainium. Several combinations can be obtained from these ionic liquids, according to various embodiments, to open—for example—the possibility of pain-killer releasing ferules (FIG. 8). The secondary ionic liquid thus produced would be lidocainium ibuprofenate.

FIGS. 9A-9F show various examples of anionic portions and cationic portions—e.g., each to variously function as a respective one of anionic potion $A^-$ or cationic portion $B^+$ of scheme 1, respectively—each of an epoxy system according to an embodiment. Some embodiments variously blend epoxy polymer technology with the emerging field of pharmaceutical active ionic liquids. FIGS. 9A-9F show some examples of useful therapeutic materials that can be adapted for use according to various embodiment.

FIGS. 10A-10I show various examples of hardener compounds, epoxy compounds and modifiers each of an epoxy system according to a respective embodiment. Some or all of the compounds shown in FIGS. 10A-10I can each be a component of a respective system having, for example, some of all of the features of the system shown in scheme 1.

It is important to remark that the existence of a large number of possible counter-ions permits the design of a final polymer that is to meet any of a wide variety of specifications required by the end user of a solvent-less ionic liquid epoxy system. Combination of the proper ions could tune polymer properties such as flexibility, hardness, hydrophobicity, curing time, curing temperature, set up secondary reactions, ionic conductivity, etc. Also, the design of ionic liquid crosslinking agents, accelerators, and catalysts (examples shown in FIGS. 10A-10I) would guaranty that the whole epoxy system is composed of zero vapor pressure components.

Due at least in part to some or all such characteristics, it can be possible, as an example, to produce thermoset solid state electrolytes, important in the development of batteries for the storage of electrical energy. A solvent-less ionic liquid epoxy system according to some embodiments allows the injection of an electrolyte into the battery structure, setting up a polymerization reaction to provide a fully polymerized, ionic liquid filled, solid state electrolyte.

Figure 11:
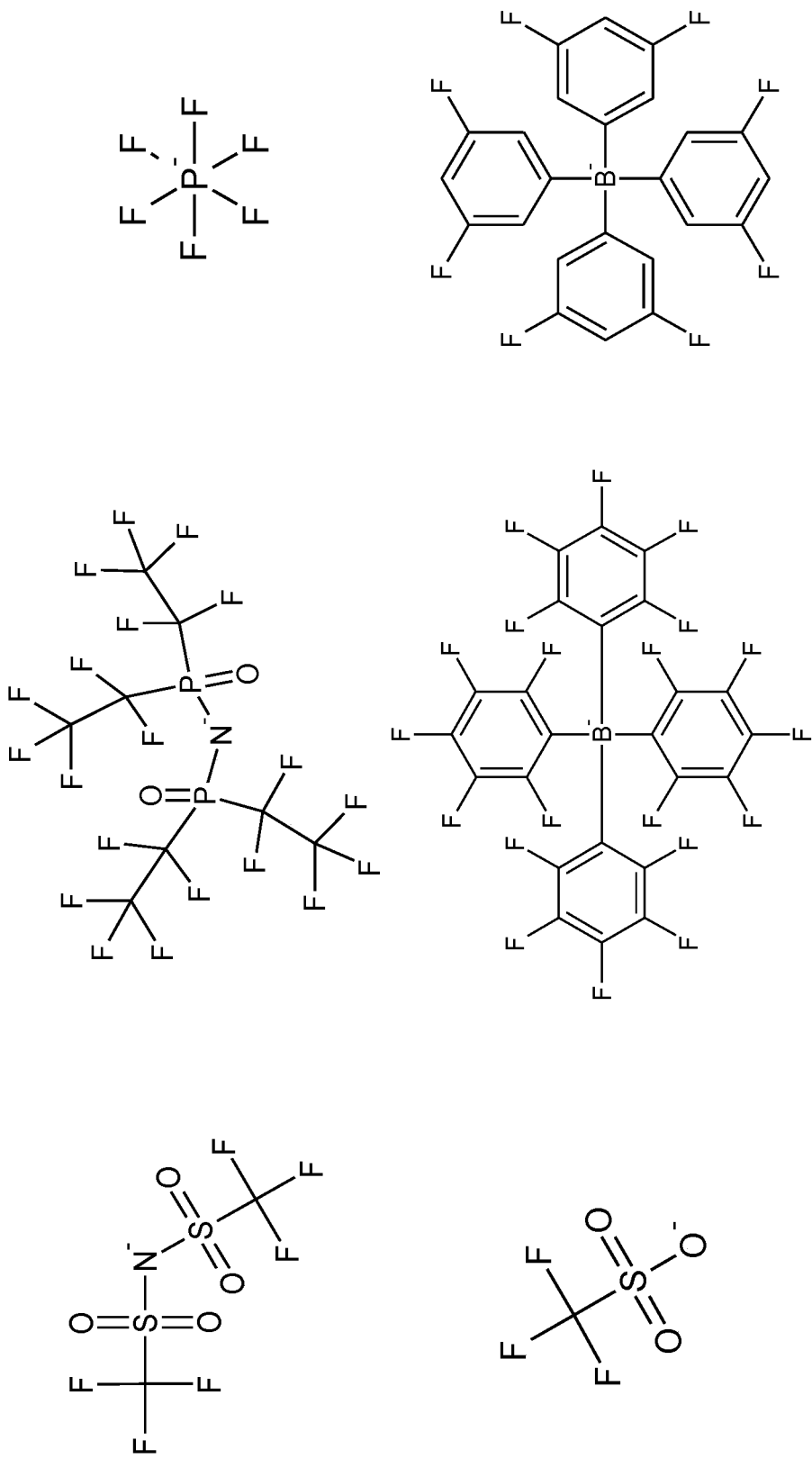
FIG. 11 shows the chemical structures of examples of hydrophobic anions usable for the synthesis of ionic liquid epoxides and hardeners, in accordance with embodiments disclosed herein.

FIG. 11 shows various examples of an anionic portion—e.g., the anionic portion A-shown in scheme 1—each of a respective epoxy system according to an embodiment. FIG. 12 shows various examples of cationic portions—e.g., the cationic portions $B^+$ shown in scheme 1—each of a respective epoxy system according to an embodiment.

As mentioned above, hydrophobic materials could be produced from ionic liquids epoxies with selection of the corresponding counter ions to the hardener and epoxy ionic liquids. A wide variety of hydrophobic anions (FIG. 11) and hydrophobic cations (FIG. 12) are available to facilitate selection of a combination that, according to different embodiments, precisely accommodates a particular desired level of hydrophobicity for a final material.

Figure 13:
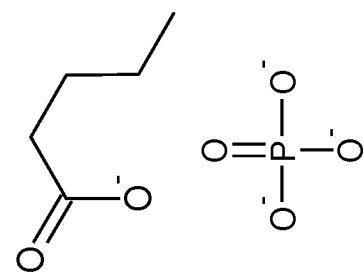
FIG. 13 shows the chemical structures of examples of hydrophilic anions usable for the synthesis of ionic liquid epoxides and hardeners.
Figure 13:
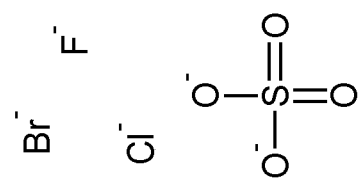
Figure 13:
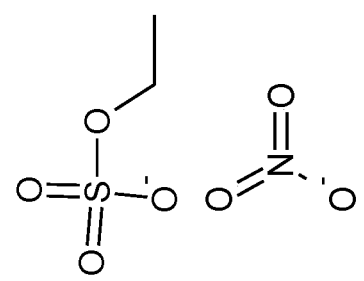

FIG. 13 shows various examples of an anionic portion—e.g., the anionic portion A- shown in scheme 1—each of a respective epoxy system according to an embodiment. As illustrated by the examples shown in FIG. 11, it can be possible to synthesized epoxides ionic liquids where the secondary ionic liquid has a prominent hydrophilic character. Many inorganic anions are highly hydrophilic (FIG. 13) and require bulky anions to produce ionic liquids.

Figure 14:
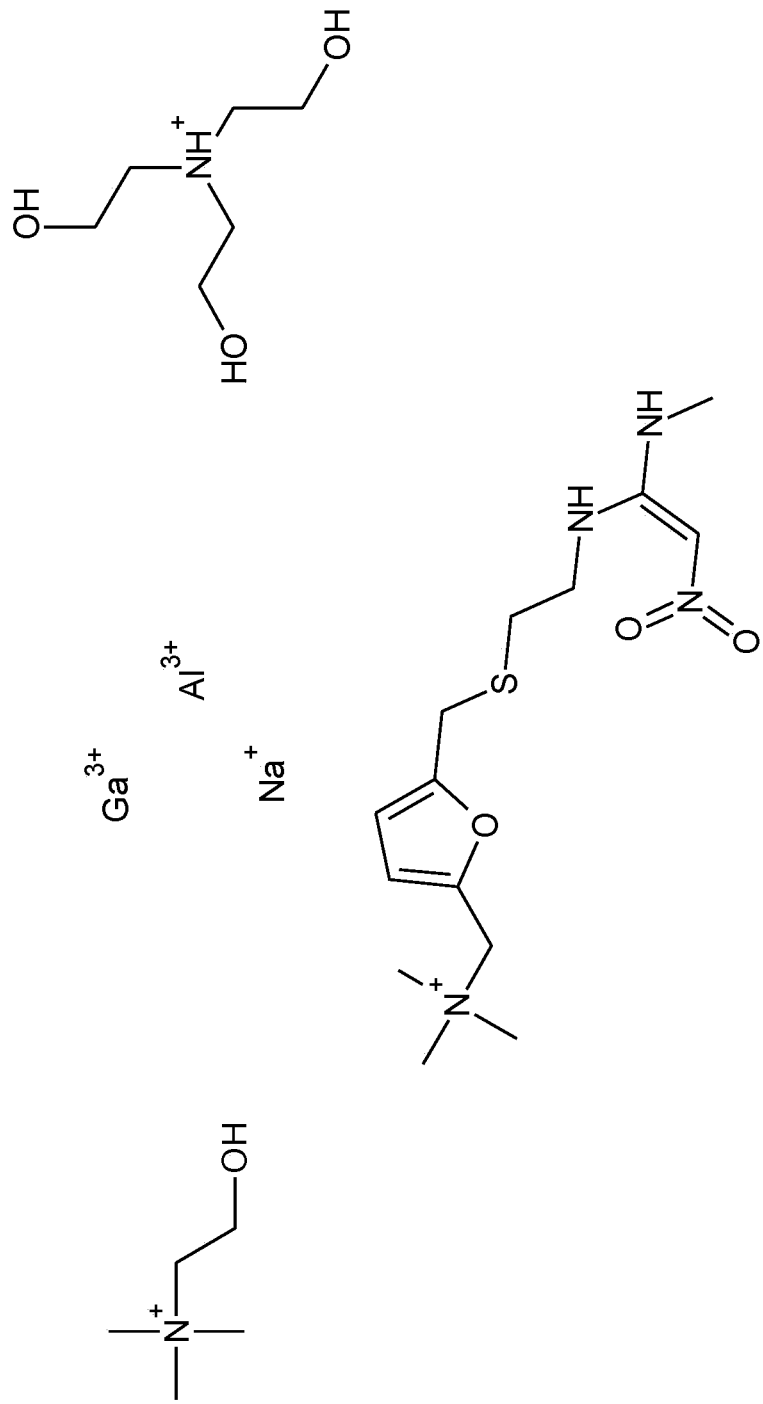
FIG. 14 shows the chemical structures of examples of hydrophilic cations usable for the synthesis of ionic liquid epoxides and hardeners, in accordance with embodiments disclosed herein.
Figure 15B:
FIGS. 15A-15F show the chemical structures of examples of biological active ionic liquids (BAILs) to be used as an active material in ionic liquid epoxies systems, FIG. 15A) 1-alkyl-1-methylpiperidinium-4-(4-chloro-2-methylphenoxy)butanoate, herbicide.
Figure 15A:
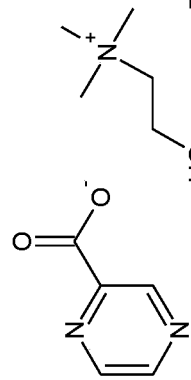
Figure 15C:
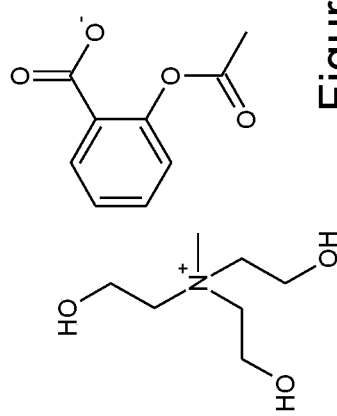
Figure 15D:
Figure 15E:
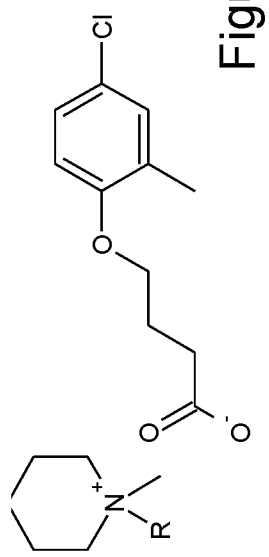
Figure 15F:
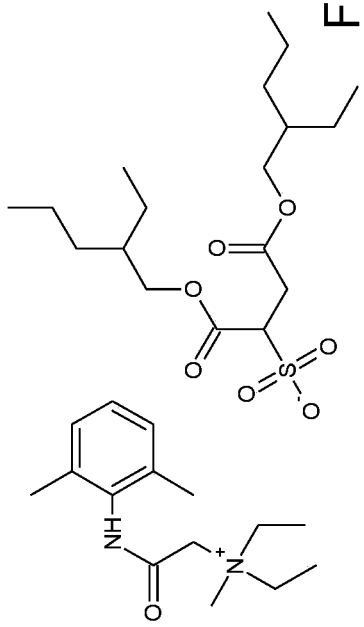
Figure 16B:
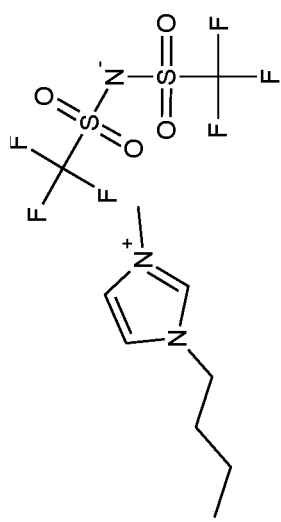
FIGS. 16A-16F show the chemical structures of examples of ionic liquids used as plasticizers in polymer and epoxides systems, FIG. 16A) 1-butyl-3-methylimidazolium tetrafluoroborate, FIG. 16B) 1-butyl-3-methylimidazolium bis(trifluoromethylsulfonyl)imide, FIG. 16C) tetrahexylphosphonium decanoate, FIG. 16D) 1-ethylpyridinium bis(2-ethylhexyl)sulfosuccinate, FIG. 16E) 1-butyl-3-methylimidazolium hexafluorophosphate, FIG. 16F) 1-octyl-3-methylimidazolium chloride, in accordance with embodiments disclosed herein.
Figure 16D:
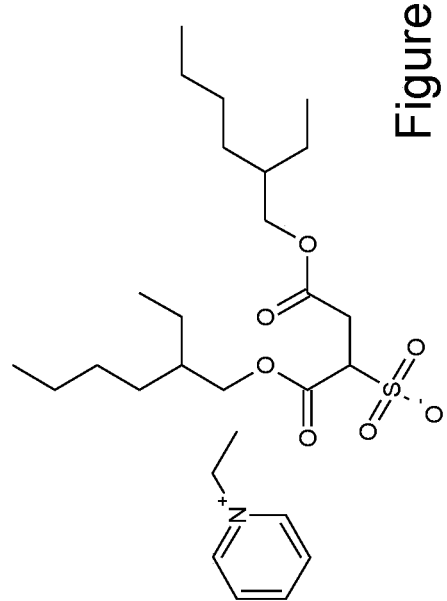
Figure 16F:
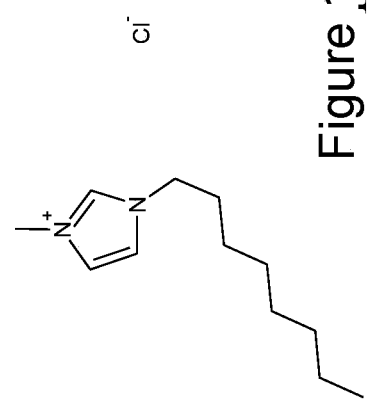
Figure 16A:
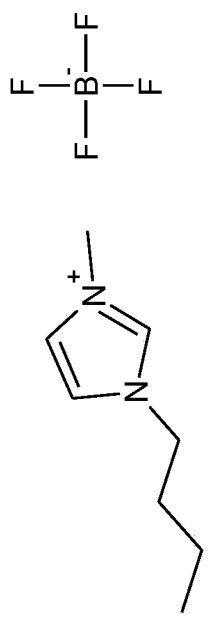
Figure 16C:
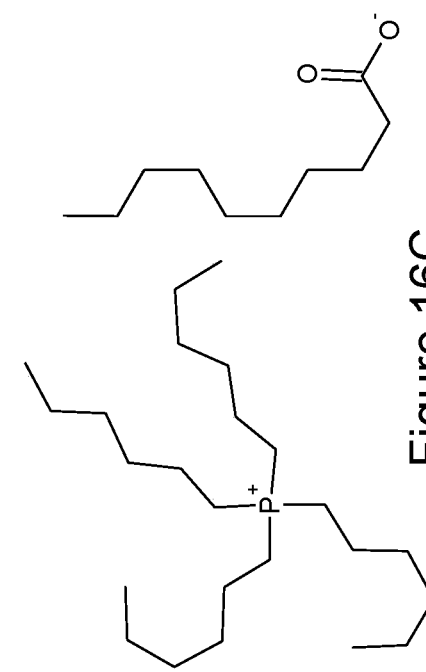
Figure 16E:
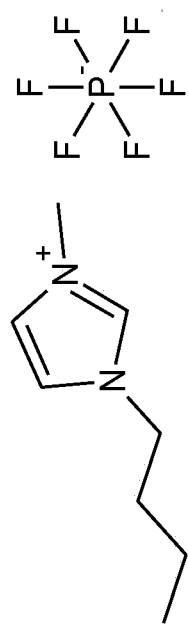
Figure 17C:
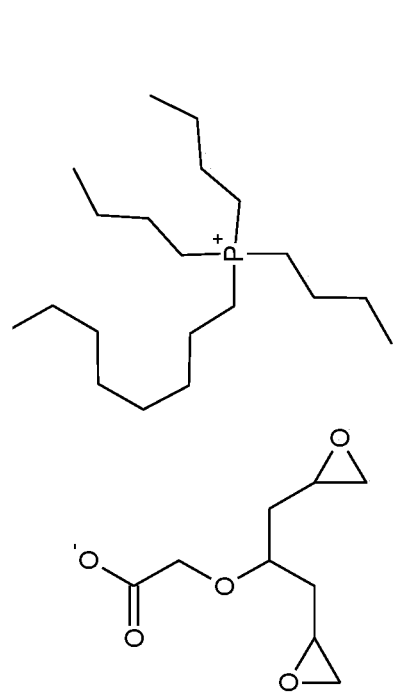
FIGS. 17A-17D show the chemical structures for BPA-free ionic liquid epoxy systems, FIG. 17A) example of an aliphatic epoxy resin, FIG. 17B) example of an aliphatic hardener, FIG. 17C) second example of an aliphatic epoxy resin, and FIG. 17D) Aromatic non phenolic example of an epoxy resin, in accordance with embodiments disclosed herein.
Figure 17D:
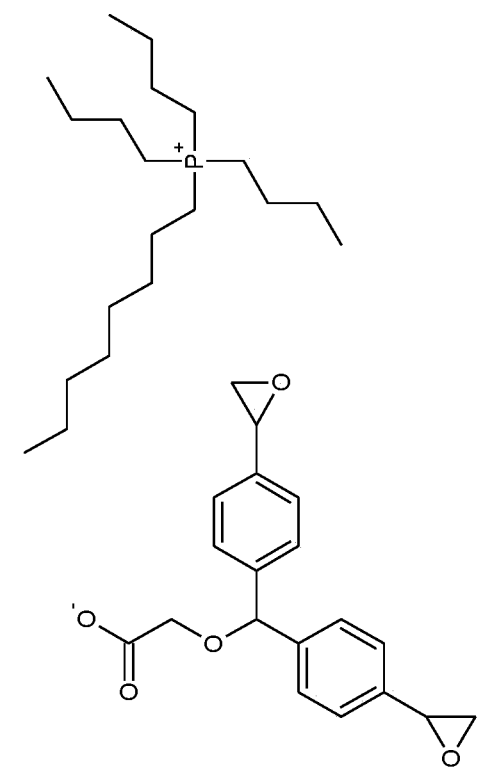
Figure 17A:
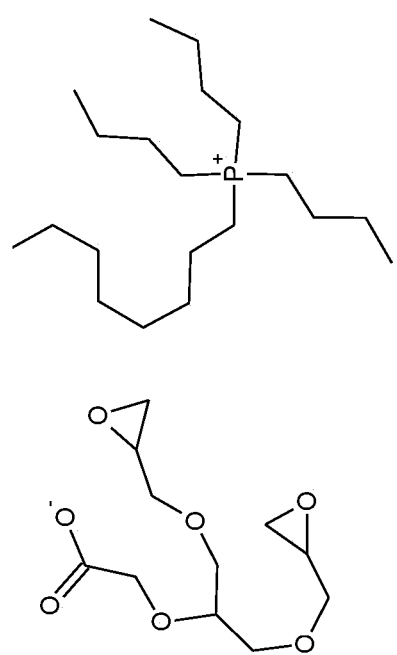
Figure 17B:
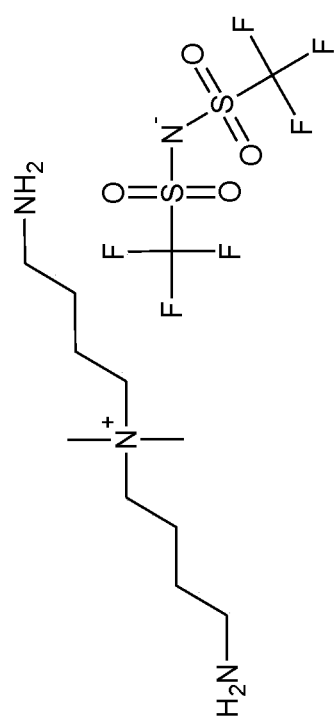

FIG. 14 shows various examples of a cationic portions—e.g., the cationic portion B+ shown in scheme 1—each of a respective epoxy system according to an embodiment. FIG. 14 illustrates inorganic cations and organic cations with hydrogen bond donor moieties that are also highly hydrophilic.

FIGS. 15A-15F show various examples of an ionic liquid epoxy compound—e.g., such as that shown in scheme 1—each of a respective epoxy system according to an embodiment. There is a wide range of biologically active ionic liquids (BAILs), from ionic liquids with herbicidal properties to ionic liquids with antitumor activity. Some examples are shown in FIGS. 15A-15F. New BAILs are being introduced regularly, and many of these BAILs can be used as a secondary ionic liquid in the ionic liquid epoxy systems providing a drug-eluding material after the proper curing process. Other examples are the ionic liquids derived from flufenamic acid (non-steroidal anti-inflammatory drugs) and ampicillin (anti-tumor activity).

FIGS. 16A-16F show various examples byproduct compounds each to be formed by a reaction of a respective epoxy system according to an embodiment. The compounds shown in FIGS. 16A-16F can each be formed, for example, by the reaction of the anion A− with the cation B+ shown in scheme 1.

Plasticizers are used to modify the mechanical properties of different polymers—e.g., changing the rigidity, deformability, elongation; toughness, process viscosity, service temperature and/or the like. Traditionally, there are two types of plasticizers: inner and external plasticizers. Inner plasticizers are structural modifications to the polymers that affect its mechanical properties, i.e. copolymerization moieties, addition of substituent groups, etc. External plasticizers are additives incorporated during the polymers processing, that have effect on the crystallinity of the polymers. Organic solvents are usually utilized as plasticizers but their efficiency is typically related to the permanence of the solvent in the polymer structure. Many common plasticizers dissipate over time—e.g., at a rate depending on parameters such as volatility, boiling point, osmotic pressure and solvent power. Due to such problems, ionic liquids—which have relatively very low vapor pressure—can be used as a new class of plasticizers, in some embodiments. Such use can take advantage of better solvent powers, osmotic pressures and low volatility. Some of the ionic liquids used as plasticizers are shown in FIGS. 16A-16F and all of them can be used as the secondary ionic liquid in the ionic liquid epoxides systems.

FIGS. 17A-17D show various examples of an epoxy compound—e.g., such as that shown in scheme 1—each of a respective epoxy system according to an embodiment. In recent years it has been discovered that the presence of Bis Phenol A (BPA) in various polymer formulations presents a health hazard concern. BPAs have been associated/correlated to problems in the reproduction systems of women and men, birth defects in children, metabolic diseases and immune system affectation. For these and/or other reasons, it is important for manufacturers to have BPA-free options in polymer production. Since solvent-less ionic liquid epoxide system according to various embodiments have low intrinsic vapor pressure and the risk of volatile BPAs is relatively low, they can be important in mitigating the possibility of BPA contamination in polymer-based products intended for human use. Aliphatic systems are one example of an implementation that can mitigate BPA problems. Some proposed structures to mitigate the possibility of BPA byproducts are show in FIGS. 17A-17D.

Figure 18B:
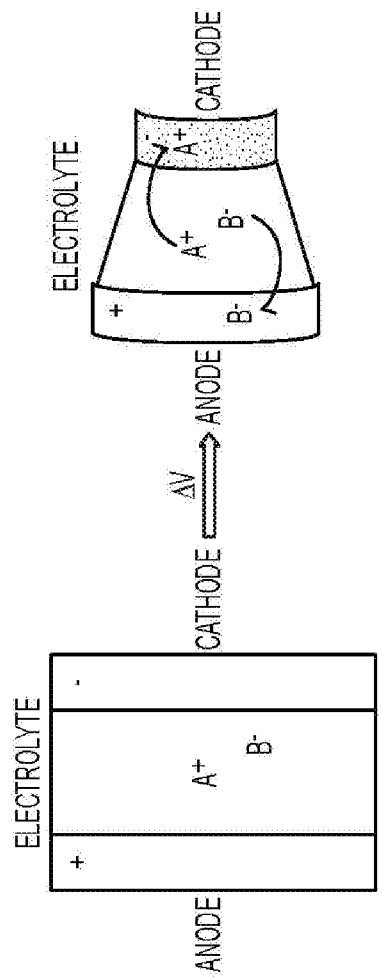
FIGS. 18A and 18B are schematics showing examples of: an electrochemical cell with a solid electrolyte component (FIG. 18A); and an electrochemical actuator with a volume change in the electrodes due to the applied potential (FIG. 18B), in accordance with embodiments disclosed herein.
Figure 18A:
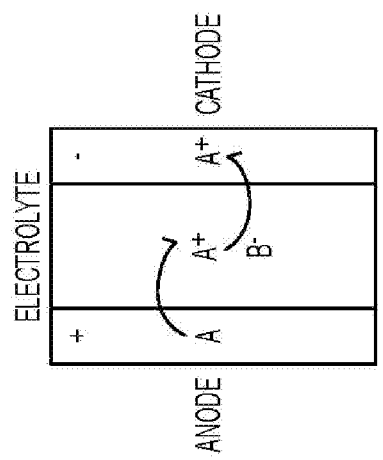

FIGS. 18A-18B show an example of devices each including a respective epoxy material according to an embodiment. For example, the devices of FIGS. 18A and 18B can each include a respective epoxy material such as one formed by a reaction such at that shown in scheme 1.

Solid electrolytes and electrochemical actuators are closely related—e.g., both systems are generally compromised of a polymeric matrix containing an electrolyte (organic or inorganic salt) between two electronic conductors (electrodes). The main difference is that in solid electrolytes the corresponding chemistries are typically designed to minimize a volume change in the electrodes, the volume change provoked by ion migration due to an applied potential (FIG. 18A), where the electrolyte concentration is to be constant during the charge and discharge cycles. On the other hand, in an electrochemical actuator, a different effect is desired—e.g., wherein electrode volume and electrolyte concentration are to change. Accordingly, a different chemistry can be needed in order to provoke a differential volume change in the electrodes (FIG. 18B), resulting in compression in one side of the cell and expansion in the opposite side, this phenomena is used to produce a movement proportional to the potential difference applied to the cell.

Ionic liquid epoxide systems according to different embodiments can be variously adapted for the production of respective ones of solid electrolytes and electrochemical actuators. Such an epoxy system can facilitate synthesis of a polymeric matrix (epoxide polymer) with the production of a secondary ionic liquid as a byproduct of the polymerization reaction. A transition between an electrochemical cell with a solid state electrolyte and an electrochemical actuator can be based on design-time selection of the secondary ionic liquid ions and the composition of the electrodes. Also, the presence of these electromechanical properties can allow an ionic liquid epoxide system to provide improved design and development of piezoelectric materials—e.g., due to a strong correspondence between the mechanical stress in a polymer and an applied electrochemical potential. One possible use for this technology is the construction of a wide variety of sensors.

Self-Healing Polymer

Figure 19:
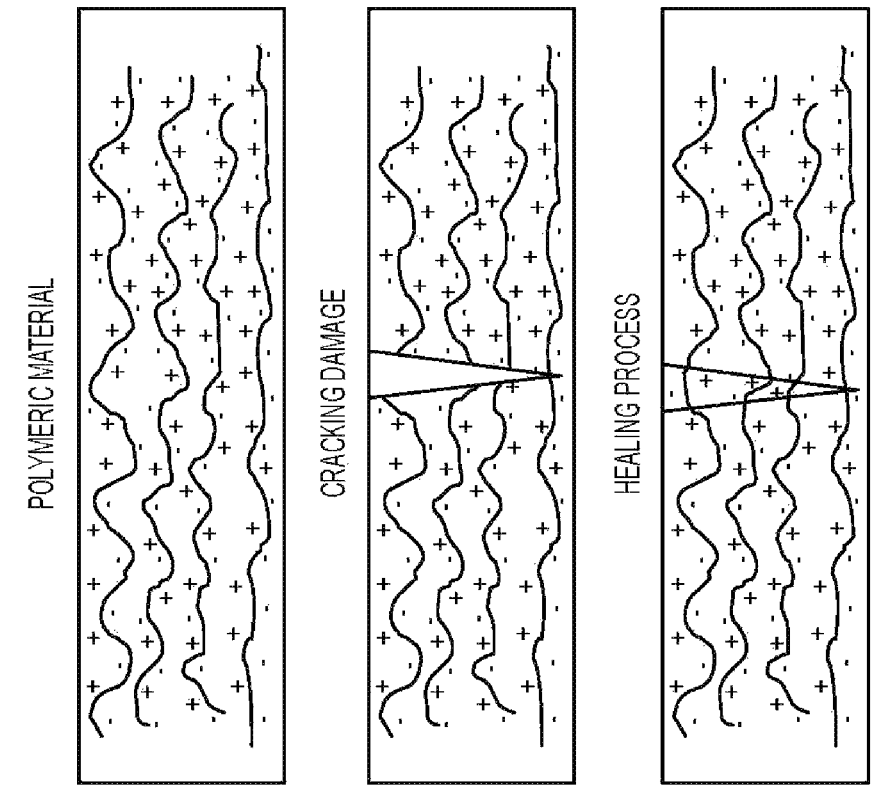
FIG. 19 is a set of cross sectional schematics showing the healing process of polymer systems containing fixed charges in the main chains of the polymer structure. After a mechanical damage is present (cracking), the electrostatic attraction of the charge in the polymer structure carried out the "healing" of the material, in accordance with embodiments disclosed herein.

FIG. 19 shows an example of a self-healing polymer including an epoxy material according to a disclosed embodiment, for example, the epoxy material formed by a reaction such at that shown in scheme 1. Self-healing polymers are materials capable of repair themselves from mechanical damage, as scratches, punctures, or cracking. There are several mechanisms that provide the polymers with the self-healing properties being the most used the formation of micro-capsules filled with the monomeric material and catalysts that react after the formation of the mechanical damage. However, there are also polymeric materials that consist of ionomeric chains, where the healing process is drive for the electrostatic attraction of the charges present in the polymers structure. FIG. 19, shows a cross-sectional illustration of a healing process for this kind of system.

The nature of ionic liquid epoxide systems according to some embodiments can variously enable polymeric chains with fixed charges that are suited to promote self-healing properties of a material, for example, wherein a secondary ionic liquid produced during the polymerization reaction is to act as a plasticizer improving the mechanical behavior of the final product.

Polymer Films

Figure 20:
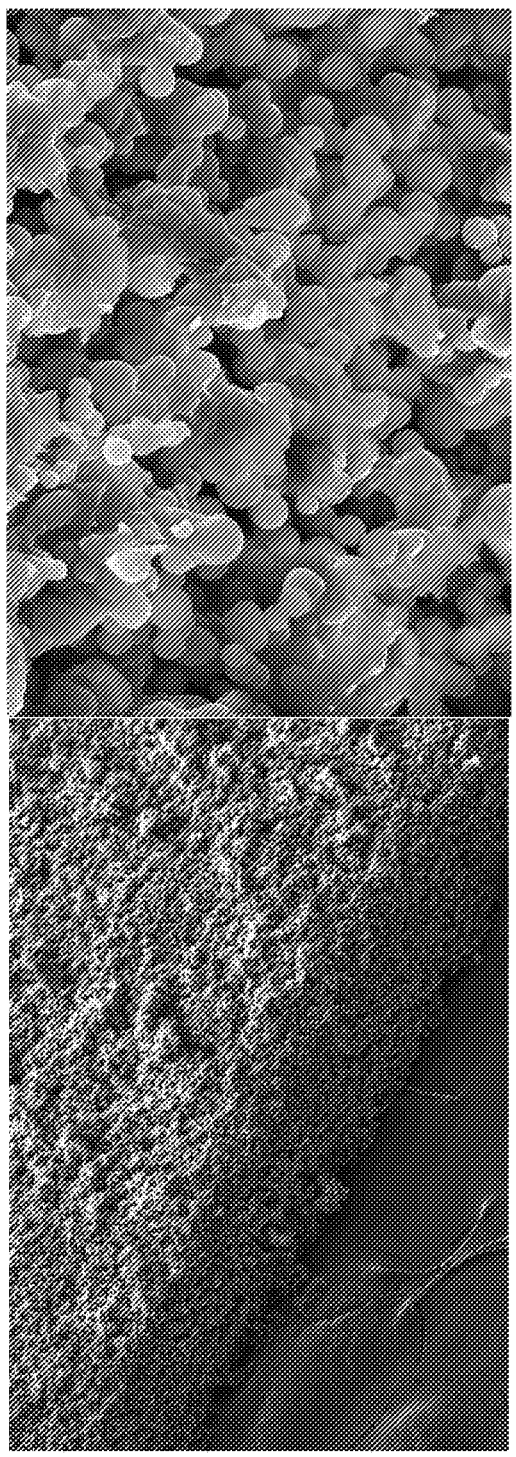
FIG. 20 is a set of scanning electron microscope (SEM) images of a Jeffamine-BPA film cured in presence of 50% w/w of tetrabutylphosphonium TFSI ionic liquid. Before the SEM analysis the film was washed with methanol several times in order to remove the ionic liquid and dried in a vacuum oven (35° C. full vacuum, 48 h), in accordance with embodiments disclosed herein.

FIG. 20 shows an example of a film including an epoxy material according to disclosed embodiments, for example, the epoxy material formed by a reaction such at that is shown in scheme 1.

Modification of epoxide polymers using an ionic liquid can be performed to change curing reaction conditions, such as temperature, time, hardener/resin ratio and/or the like. For example, ionic liquid content in an epoxy system can be in a range of 2 to 5 parts per hundred rubber (phr) when utilized as a modifier. Ionic liquids can be used in a range of 5 to 10 phr to modify the viscosity of some epoxide components during a curing process. However, with higher ionic liquids contents (around 30 to 70% w/w of the total mass), the ionic liquid tends to produce void space in the final material. After washing out this ionic liquid, the resulting material is a highly porous solid with porous size in the order of 10-20 μm (See FIG. 20 SEM image of a Jeffamine-BPA system with 50% tetrabutyl phosphonium TFSI ionic liquid). An ionic liquid epoxide system according to some embodiments can produce similar results, with a final product that could be used as a filter structure with a highly regular porous size. By modifying the ionic liquid content, it can be possible to selectively design ("tune") the resulting porous size and selectivity of the filter system.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method of preparing a diamine imidazolium halide, the method comprising:
    reacting a haloalkylamine with a triphenylmethyl halide to yield a protected haloalkylamine, wherein the haloalkylamine is a primary amine and the protected haloalkylamine is a secondary amine;
    reacting the protected haloalkylamine with an alkylimidazole to yield a bisubstituted alkylimidazole;
    removing the triphenylmethyl from the bisubstituted alkylimidazole to yield a halide derivative of the bisubstituted alkylimidazole; and
    neutralizing the halide derivative of the bisubstituted alkylimidazole to yield the diamine imidazolium halide,
    wherein:
        the haloalkylamine is bromoethylamine,
        the triphenylmethyl halide is tritylchloride,
        the protected haloalkylamine is bromoethyltriphenylmethylamine;
        the alkylimidazole is 2-methylimidazole, and
        the diamine imidazolium halide is 1,3-di(2'-aminoethylene)-2-methylimidazolium bromide.

2. The method of claim 1, wherein reacting the haloalkylamine with the triphenylmethyl halide occurs in the presence of triethylamine and dichloromethane.

3. The method of claim 1, wherein reacting the protected haloalkylamine with the alkylimidazole occurs in the presence of sodium hydride and dimethylformamide.

4. The method of claim 1, wherein removing the triphenylmethyl from the bisubstituted alkylimidazole occurs in acidic media.

5. The method of claim 1, wherein neutralizing the halide derivative of the bisubstituted alkylimidazole occurs in basic media.

6. An ionic liquid comprising the diamine imidazolium halide of claim 1.

7. The method of claim 1, wherein the 1,3-di(2'-aminoethylene)-2-methylimidazolium bromide is a hardener compound of an ionic liquid epoxy system.

8. The method of claim 7, wherein the 1,3-di(2'-aminoethylene)-2-methylimidazolium bromide is configured to react with an ionic epoxy compound of the ionic liquid epoxy system.

9. The method of claim 8, wherein the ionic epoxy compound comprises: a molecular structure ($Z^1$—$R_2$—$Z^2$), where $R_2$ is an ionic moiety, $Z^1$ comprises an epoxide group, and $Z^2$ comprises an epoxide group; and an ionic moiety B acting as a counter ion to $R_2$.

10. A method comprising:
    preparing 1,3-di(2'-aminoethylene)-2-methylimidazolium bromide according to the method of claim 9;
    preparing the ionic liquid epoxy system with the 1,3-di(2'-aminoethylene)-2-methylimidazolium bromide as a hardener compound; and
    reacting the 1,3-di(2'-aminoethylene)-2-methylimidazolium bromide with the ionic epoxy compound to yield a polymer.

11. The method of claim 10, wherein the polymer is suitable as a component of a battery.

* * * * *